(12) United States Patent
Mitra et al.

(10) Patent No.: US 12,536,429 B2
(45) Date of Patent: Jan. 27, 2026

(54) INTELLIGENTLY MODIFYING DIGITAL CALENDARS UTILIZING A GRAPH NEURAL NETWORK AND REINFORCEMENT LEARNING

(71) Applicant: Adobe Inc., San Jose, CA (US)

(72) Inventors: Saayan Mitra, San Jose, CA (US); Gang Wu, San Jose, CA (US); Georgios Theocharous, San Jose, CA (US); Richard Whitehead, Pleasant Grove, UT (US); Viswanathan Swaminathan, Saratoga, CA (US); Zahraa Parekh, Anaheim, CA (US); Ben Tepfer, Boston, MA (US)

(73) Assignee: Adobe Inc., San Jose, CA (US)

( * ) Notice: Subject to any disclaimer, the term of this patent is extended or adjusted under 35 U.S.C. 154(b) by 1079 days.

(21) Appl. No.: 17/337,998

(22) Filed: Jun. 3, 2021

(65) Prior Publication Data

US 2022/0343155 A1 Oct. 27, 2022

Related U.S. Application Data

(60) Provisional application No. 63/179,941, filed on Apr. 26, 2021.

(51) Int. Cl.
*G06N 3/08* (2023.01)
*G06F 9/48* (2006.01)
(Continued)

(52) U.S. Cl.
CPC ............. *G06N 3/08* (2013.01); *G06F 9/4881* (2013.01); *G06F 18/2113* (2023.01); *G06F 18/29* (2023.01); *G06V 10/751* (2022.01)

(58) Field of Classification Search
CPC ........ G06N 3/08; G06N 3/006; G06N 3/0464; G06N 3/092; G06N 7/01; G06F 9/4881;
(Continued)

(56) References Cited

U.S. PATENT DOCUMENTS

2019/0197475 A1* 6/2019 Bianconcini et al.
2021/0312280 A1* 10/2021 Taitler et al.

OTHER PUBLICATIONS

Z. Wang and M. Gombolay, "Learning Scheduling Policies for Multi-Robot Coordination With Graph Attention Networks," in IEEE Robotics and Automation Letters, vol. 5, No. 3, pp. 4509-4516, Jul. 2020, doi: 10.1109/LRA.2020.3002198 (Year: 2020).*

(Continued)

*Primary Examiner* — Shahid K Khan
*Assistant Examiner* — Hyungjun B Yi
(74) *Attorney, Agent, or Firm* — Keller Preece PLLC

(57) ABSTRACT

This disclosure describes methods, non-transitory computer readable storage media, and systems that intelligently generate and modify schedules of task sequences utilizing a graph neural network and/or reinforcement learning model. For example, the disclosed system utilizes a graph neural network to generate performance efficiency scores indicating predicted performances of the sets of tasks. Additionally, the disclosed systems utilizes the performance efficiency scores to rank sets of tasks and then determine a schedule including an ordered sequence of tasks. Furthermore, disclosed system generates modified schedules in response to detecting a modification to the schedule. For example, the disclosed system utilizes a reinforcement learning model to provide recommendations of new tasks or task sequences deviating from the schedule in the event of an interruption. The disclosed system also utilizes the reinforcement learning model to learn from user choices to inform future scheduling of tasks.

20 Claims, 19 Drawing Sheets

(51) Int. Cl.
  *G06F 18/20* (2023.01)
  *G06F 18/2113* (2023.01)
  *G06V 10/75* (2022.01)
(58) Field of Classification Search
  CPC ............... G06F 18/2113; G06F 18/29; G06F 18/24133; G06F 18/217; G06V 10/751
  See application file for complete search history.

(56) References Cited

OTHER PUBLICATIONS

Hameed, M. S. A., & Schwung, A. (2020). Graph neural networks-based Scheduler for Production planning problems using Reinforcement Learning. arXiv preprint arXiv:2009.03836. (Year: 2020).*

Zhang, M., Wu, S., Gao, M., Jiang, X., Xu, K., & Wang, L. (2020). Personalized graph neural networks with attention mechanism for session-aware recommendation. IEEE Transactions on Knowledge and Data Engineering, 34(8), 3946-3957.) (Year: 2020).*

Pinedo, M. L. (2012). Scheduling (vol. 29, p. 249). New York: Springer. (Year: 2012).*

Mao, H., Schwarzkopf, M., Venkatakrishnan, S. B., Meng, Z., & Alizadeh, M. (2019). Learning scheduling algorithms for data processing clusters. In Proceedings of the ACM special interest group on data communication (pp. 270-288). (Year: 2019).*

Wang, X., He, X., Wang, M., Feng, F., & Chua, T. S. (Jul. 2019). Neural graph collaborative filtering. In Proceedings of the 42nd international ACM SIGIR conference on Research and development in Information Retrieval (pp. 165-174). (Year: 2019) .*

Sanchez-Lengeling, B., Wei, J., Lee, B., Reif, E., Wang, P., Qian, W., . . . & Wiltschko, A. (2020). Evaluating attribution for graph neural networks. Advances in neural information processing systems, 33, 5898-5910. (Year: 2020).*

Ying, Z., Bourgeois, D., You, J., Zitnik, M., & Leskovec, J. (2019). Gnnexplainer: Generating explanations for graph neural networks. Advances in neural information processing systems, 32. (Year: 2019).*

Luo, D., Cheng, W., Xu, D., Yu, W., Zong, B., Chen, H., & Zhang, X. (2020). Parameterized explainer for graph neural network. Advances in neural information processing systems, 33, 19620-19631. (Year: 2020).*

De Nijs, F., Theocharous, G., Vlassis, N., De Weerdt, M. M., & Spaan, M. T. J. (2018). Capacity-aware sequential recommendations. In M. Dastani, & G. Sukthankar (Eds.), AAMAS'18—Proceedings of the 17th International Conference on Autonomous Agents and MultiAgent Systems: Jul. 10-15, 2018 Stockholm, Sweden (pp. 416-424). International Foundation for Autonomous Agents and Multiagent Systems. https://dl.acm.org/citation.cfm?id=3237448&dl=ACM&coll=DL.

* cited by examiner

INTELLIGENTLY MODIFYING DIGITAL CALENDARS UTILIZING A GRAPH NEURAL NETWORK AND REINFORCEMENT LEARNING

CROSS-REFERENCE TO RELATED APPLICATIONS

This application claims priority to and the benefit of U.S. Provisional Patent Application No. 63/179,941, filed Apr. 26, 2021, which is incorporated herein by reference in its entirety.

BACKGROUND

Digital calendaring is widely prevalent for many different applications and across many different computing devices in both professional and non-professional environments. For example, many systems utilize digital calendaring algorithms and implementing computing devices to organize tasks according to time and/or sequence and provide digital calendaring user interfaces to assist in completing these tasks. Scheduling tasks or activities utilizing a network of computing devices can be challenging when introducing various task or time constraints, as well as preferences or task priorities. Furthermore, utilizing computing devices to accurately schedule tasks throughout a specific time period (or periods) becomes more challenging when encountering unexpected interruptions (e.g., additional tasks or missed tasks).

Some existing systems that perform digital scheduling of tasks utilize a scheduler to automatically assign tasks within a given time period. Specifically, given a priority list and/or additional information associated with the tasks, the existing systems utilize a scheduling algorithm to generate a schedule that accomplishes as many of the tasks as possible within the time period. While these existing systems provide automatic scheduling of tasks, the existing systems utilize assumptions that limit the accuracy and flexibility of the systems. In particular, the existing systems typically assume homogeneity and independence of tasks to complete a schedule including the tasks. Thus, the existing systems fail to account for differences in categories of tasks and/or connections between tasks during scheduling.

Furthermore, existing systems that generate schedules utilizing algorithms such as directed acyclic graphs are inefficient. For instance, because such systems rely on information provided explicitly by a user (e.g., task priorities/dependencies) to generate a schedule, generating schedules via the systems can be slow and burdensome. More specifically, the systems are rigidly reliant on user input to generate schedules and are unable to modify the schedules based on new information. Accordingly, the systems must generate a new schedule with additional user input each time the systems need to make modifications to a timeline or to a set of tasks in the schedules.

SUMMARY

This disclosure describes one or more embodiments of methods, non-transitory computer readable media, and systems that solve the foregoing problems (in addition to providing other benefits) by intelligently generating and modifying schedules of task sequences utilizing a graph neural network and/or reinforcement learning model. For example, the disclosed systems utilize a graph neural network in an offline mode (e.g., at the beginning of a particular day) to generate a schedule for a set of tasks. By utilizing a graph neural network trained on historical events of a plurality of users, the disclosed systems select and arrange tasks specific to the context, features, and constraints of a particular user, set of events, and/or time period. The disclosed systems can then utilize implementing devices to monitor progress of the schedule of tasks and determine disruptions, changes, or modifications (e.g., new tasks, missed tasks, or changed tasks). For instance, in response to identifying interruptions, the disclosed systems utilize a reinforcement learning model (in an online mode) to automatically adjust a digital calendar based on learned context and applicable constraints. The disclosed systems utilize the reinforcement learning model to automatically re-arrange tasks, reassign tasks to other users, and intelligently generate a modified schedule based on the tasks that have already been performed, the tasks that are yet to be completed, and pertinent constraints. Accordingly, the disclosed system can intelligently work within user or event specified constraints to automatically generate revised digital calendars to efficiently arrange and prioritize tasks while communicating these tasks to pertinent devices.

To illustrate, in one or more embodiments the disclosed systems utilize a graph neural network with a bipartite architecture of nodes to generate performance efficiency scores for sets of tasks indicating predicted performances of the sets of tasks in connection with a user. Additionally, the disclosed systems utilize the performance efficiency scores (and/or task contribution scores determined from internal weights of the graph neural network) to rank sets of tasks and then determine a schedule including an ordered sequence of tasks from the ranked sets of tasks. Furthermore, disclosed systems generate modified schedules in response to detecting an interruption or other modification to the schedule. For example, the disclosed systems utilize a reinforcement learning model to provide recommendations of new tasks or task sequences deviating from the schedule in the event of an interruption. In some embodiments, the disclosed systems also utilize the reinforcement learning model to learn from user choices/preferences to inform future scheduling of tasks for the user. In this manner, the disclosed systems improve the flexibility, accuracy, and efficiency of computing systems in digital task management.

BRIEF DESCRIPTION OF THE DRAWINGS

The detailed description refers to the drawings briefly described below.

DETAILED DESCRIPTION

Figure 1:
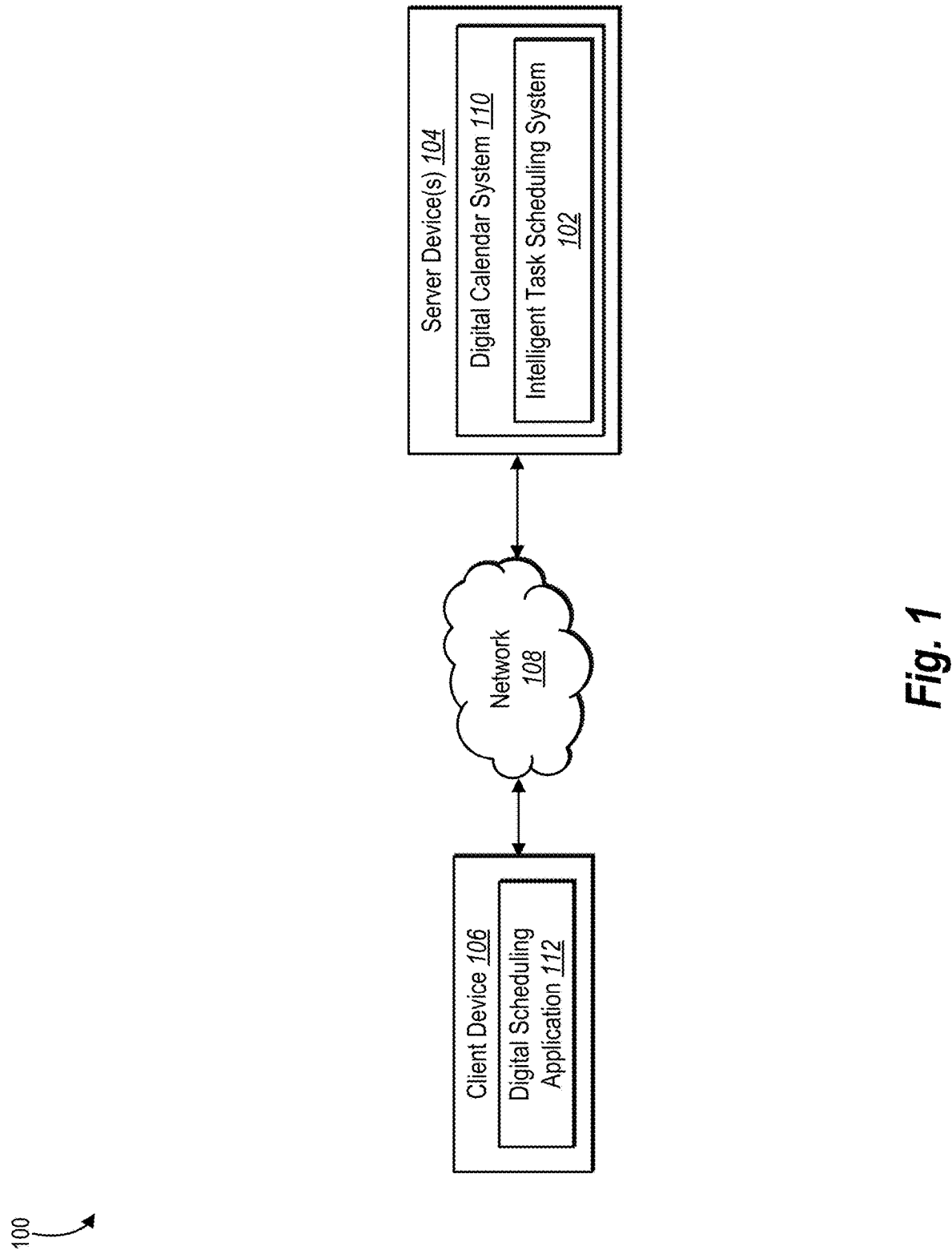
FIG. 1 illustrates a block diagram of a system environment in which an intelligent task scheduling system is implemented in accordance with one or more implementations.

This disclosure describes one or more embodiments of an intelligent task scheduling system (or "task scheduling system") that improves efficiency, accuracy, and flexibility of implementing computing systems by utilizing a graph neural network and/or reinforcement learning model to dynamically generate and modify digital schedules for a plurality of tasks. Specifically, in one or more embodiments, the task scheduling system utilizes a graph neural network to predict performance corresponding to task sets by a particular user for a given time period. In one or more embodiments, the task scheduling system also determines the contribution of each task to the overall predicted performance of a set of tasks. The task scheduling system utilizes the predicted performance of the sets of tasks (and in some instances the task contributions) to determine a schedule including an ordered sequence of a selected set of tasks for the time period. In one or more additional embodiments, the task scheduling system detects an interruption or modification to the schedule to the time period. The task scheduling system utilizes a reinforcement learning model to provide a recommendation of one or more tasks to modify the schedule based on the interruption/modification.

As mentioned, in one or more embodiments, the task scheduling system utilizes a graph neural network to predict performance corresponding to task sets. For example, the graph neural network includes a bipartite graph architecture that has a set of user nodes and a set of task nodes. In particular, the user nodes correspond to users of the task scheduling system, and the task nodes correspond to candidate tasks. The task scheduling system utilizes the graph neural network to generate edge weights between the user nodes and the task nodes by capturing dependencies between different nodes in the bipartite graph.

In some embodiments, the task scheduling system utilizes the graph neural network to generate edge weights between user nodes and task nodes according to contextual information associated with tasks. To illustrate, the task scheduling system annotates the task nodes with values such as times, locations, etc., for separating similar tasks by context. The task scheduling system thus utilizes the graph neural network to capture dependencies between user nodes and annotated task nodes with contextual information.

In addition to predicting performance of task sets utilizing a graph neural network, in one or more embodiments, the task scheduling system also determines the contribution of individual tasks to the predicted performance for a given task set. For instance, the task scheduling system utilizes an additional inferencer model with the graph neural network to generate task contribution scores for a plurality of task nodes. In particular, in some embodiments, the task scheduling system normalizes edge weights associated with each task nodes to generate the task contribution scores. The task scheduling system then utilizes the task contribution scores to provide recommendations of tasks to add to a set of tasks or remove from a set of tasks associated with a user.

Furthermore, in one or more embodiments, the task scheduling system determines a schedule including an ordered sequence of tasks for a given time period for a user. To illustrate, the task scheduling system determines a ranked list of task sets for a user based on the performance efficiency scores for a plurality of candidate task sets. In some embodiments, the task scheduling system also determines the ranked list of task sets further based on task contribution scores for the tasks. The task scheduling system then determines a plurality of candidate schedules from the ranked list of task sets utilizing one or more constraints associated with a user or task.

According to one or more embodiments, after determining a schedule for a user (e.g., based on selection of the schedule by the user or automatic selection by the task scheduling system), the task scheduling system receives an indication of a modification to the schedule. Specifically, after a schedule is initiated during a time period associated with the schedule, the task scheduling system detects interruptions to the schedule. For example, the task scheduling system detects the addition or performance of a new task or a task out of sequential order during the time period. Alternatively, the task scheduling system detects a missed or uncompleted task during the time period of the schedule or in connection with a specific time associated with the task.

In response to detecting a modification to a schedule during a time period, in one or more embodiments, the task scheduling system utilizes a reinforcement learning model to provide one or more recommended tasks for a remainder of the time period associated with the schedule. For example, the task scheduling system utilizes the reinforcement learning model to account for unexpected task entries or other interruptions during the time period and intelligently modify the schedule. More specifically, the task scheduling system utilizes prior knowledge of the user's selection and/or performance of tasks in connection with previously recommended actions by the task scheduling system to recommend one or more additional tasks for dynamically modifying the schedule. Additionally, in one or more embodiments, the task scheduling system utilizes the reinforcement learning model and additional feedback based on modified schedules and/or task completion data for users to update edge weights between user nodes and task nodes of the graph neural network.

The disclosed task scheduling system can provide a number of technical advantages over conventional systems. For example, the task scheduling system can improve flexibility relative to existing systems that utilize computing devices to automate scheduling and sequencing of tasks. In contrast to existing systems that inflexibly schedule tasks for users based on explicitly provided priorities and dependencies, the task scheduling system utilize a graph neural network, an inference model, and a reinforcement learning model to dynamically learn priorities of tasks collectively from feedback data (often times without user intervention). Furthermore, the task scheduling system learns mutual dependencies among tasks from historical schedule completion data to provide recommendations of ranked lists of possible task sets and determine schedules based on the ranked lists of possible task sets.

Additionally, the task scheduling system improves efficiency over existing systems by utilizing a reinforcement learning model to replan a schedule when observing unexpected interruptions during a time period of a schedule. Specifically, the task scheduling system utilizes a Markov decision process model to determine one or more new possible sets of task sequences in response to detecting a modification to an existing schedule. In contrast to existing systems that are incapable of adjusting digitally generated schedules after creating the schedules without significant effort, the task scheduling system utilizes the reinforcement learning model to make modifications to an existing schedule generated via a graph neural network during a time period associated with the schedule. By utilizing the reinforcement learning model to adjust a schedule (e.g., via recommended actions) reduces the burden on system resources by eliminating the need to use the graph neural network (which can incur significant resource costs) during the schedule modification process.

Furthermore, the reinforcement learning model improves accuracy of computing systems that automatically generate schedules including ordered sequences of tasks over a time period. In particular, by utilizing a combination of a graph neural network (with an additional inference model) and reinforcement learning model, the task scheduling system learns user behaviors and preferences in connection with specific tasks. While existing systems require explicit and detailed priority/dependency information for tasks from users prior to generating schedules, the task scheduling system uses knowledge of historical schedule completion data to generate schedules and adjust schedules. In particular, when the task scheduling system encounters an unexpected event during a schedule, the task scheduling system uses known contextual information of candidate tasks to decide the best action(s) to take to complete the schedule for the remainder of a given time period. The task scheduling system also utilizes the reinforcement learning model to learn user propensities relative to each recommendation and provide such information to the graph neural network to improve subsequent schedules for the user.

As illustrated by the foregoing discussion, the present disclosure utilizes a variety of terms to describe features and advantages of the task scheduling system. Additional detail is now provided regarding the meaning of such terms. For example, as used herein, the term "task" refers to an activity or action to be undertaken. For example, a task includes an available action to be undertaken one or more times during one or more time periods. Specifically, tasks include single event actions or recurring actions involving one or more users. Additionally, as used herein, the term "candidate task" refers to a task available for scheduling.

As used herein, the term "schedule" refers to a sequential order of tasks during a time period. For instance, a schedule corresponds to a time period having a particular start time and a particular end time. Furthermore, as used herein, the term "modified schedule" refers to a sequential order of tasks that is modified from an initial sequential order to a new sequential order (or new arrangement of times). For example, the task scheduling system determines a modified schedule in response to detecting a modification to a schedule.

As used herein, the term "modification" refers to a change, such as an unexpected event occurring during a time period of a given schedule. For example, a modification corresponds to a detected task that does not correspond to a sequential order for a schedule, which can be a result of performance of a new task not in an original set of tasks or a task performed out of sequential order within the original set of tasks. Accordingly, a modification includes insertion of a new task into a set of tasks or a missed task from the set of tasks during a time period corresponding to a schedule for the set of tasks.

As used herein, the term "performance efficiency score" refers to a measurement of performance of a set of tasks. In particular, a performance efficiency score includes a difference between a number of completed tasks (e.g., tasks that have been performed) and a number of uncompleted tasks (e.g., tasks that have not been performed) in the set of tasks. Accordingly, a predicted or estimated performance efficiency score includes a difference between an estimated number of completed tasks and an estimated number of uncompleted task in a set of tasks as determined by a graph neural network.

As used herein, the term "neural network" (or "machine-learning model") refers to a computer representation that can be tuned (e.g., trained) based on inputs to approximate unknown functions. For instance, a neural network includes one or more layers or artificial neurons that approximate unknown functions by analyzing known data at different levels of abstraction. In some embodiments, a neural network includes a graph neural network with a data structure including a plurality of nodes and edges indicating relationships between the nodes. Additionally, in one or more embodiments, a graph neural network includes a deep learning model, a convolutional neural network, and/or a recurrent neural network. As used herein, the term "reinforcement learning model" refers to a machine-learning model that utilizes past tasks and task recommendations to determine subsequent task recommendations. For example, a reinforcement learning model includes a Markov decision process to maximize a reward associated with performance of a set of tasks in response to providing task recommendations.

As used herein, the term "bipartite graph" refers to a graph structure including vertices divided into two independent sets. For example, a bipartite graph includes a first set of nodes corresponding to users of the task scheduling system and a second set of nodes corresponding to tasks. In addition, in one or more embodiments, one or more nodes in a bipartite graph include annotations that add context information to the nodes. To illustrate task nodes include annotations that provide context such as location, day of the week or other time period, season, weather, etc. Additionally, as used herein, the term "edge weight" refers to a value corresponding to an edge between two nodes in a bipartite graph. Specifically, an edge weight includes a learned parameter or value determined by a graph neural network to indicate a relationship or a dependency between nodes in a bipartite graph.

As used herein, the term "task contribution score" refers to a measurement of a contribution of a task to a performance efficiency score of a set of tasks. For instance, a task contribution score includes a value indicating contribution of a task based on features of the task and dependencies between tasks and users. In one or more embodiments, a task contribution score includes a calculated norm of edge weights associated with a particular task node utilizing an inferencer model in connection with a graph neural network.

Turning now to the figures, FIG. 1 includes an embodiment of a system environment 100 in which an intelligent task scheduling system 102 (also referred to herein as "task scheduling system 102") operates. In particular, the system environment 100 includes server device(s) 104 and a client device 106 in communication via a network 108. Moreover, as shown, the server device(s) 104 include a digital calendar system 110, which includes the task scheduling system 102. Additionally, the client device 106 includes a digital scheduling application 112.

As shown in FIG. 1, the server device(s) 104 includes or hosts the digital calendar system 110. Specifically, the digital calendar system 110 includes, or is part of, one or more systems that implement generating digital calendars for specified time periods. For example, the digital calendar system 110 provides tools for viewing, generating, editing, and/or otherwise interacting with digital calendars. In one or more embodiments, the digital calendar system 110 determines schedules for a plurality of users for specific time periods (e.g., short time periods such as individual days for workday schedules or for longer time periods such as weeks or months for construction schedules). To illustrate, the digital calendar system 110 communicates with client devices (e.g., the client device 106) to obtain information associated with users including, but not limited to, user account information to generate digital calendars for users. Additionally, in one or more embodiments, the digital calendar system 110 provides calendar information associated with a client device to other client devices or systems (e.g., to share digital calendars among users, applications, or computing platforms).

In connection with generating digital calendars for users, the digital calendar system 110 includes the task scheduling system 102 to perform intelligent schedule generation and modification. Specifically, the task scheduling system 102 includes an offline model for generating a schedule for a user and an online model for modifying the schedule in response to a detected interruption of the schedule. For example, the task scheduling system 102 includes a graph neural network and an inferencer model as part of the offline model to select a set of tasks and generate a schedule including the set of tasks for a user. The task scheduling system 102 also includes a reinforcement learning model as part of the online model to modify a previously generated schedule in response to a detected interruption or modification to the schedule during a time period associated with the schedule.

In one or more embodiments, the task scheduling system 102 utilizes the graph neural network to generate performance efficiency scores for sets of tasks associated with a user. For example, the task scheduling system 102 includes one or more servers including the graph neural network to process user data and task data in a bipartite graph and determine performance efficiency based on dependencies/relationships between nodes in the bipartite graph. Additionally, in one or more embodiments, the one or more servers include the inferencer model to determine the contribution of each task to the performance efficiency of task sets. The task scheduling system 102 then utilizes the performance efficiencies and task contributions to rank task sets for a user and determine one or more schedules based on the ranked task sets.

Additionally, as mentioned, the task scheduling system 102 utilizes the reinforcement learning model to modify a schedule based on an interruption to the schedule. Specifically, in response to detecting a modification to a previously generated schedule (e.g., as an unexpected task) performed during a time period of the schedule, the task scheduling system 102 utilizes the reinforcement learning model to provide recommended actions to a user (e.g., via the digital scheduling application 112 of the client device 106). For instance, the task scheduling system 102 utilizes the reinforcement learning model to determine one or more recommended tasks based on task/recommendation histories associated with the user and predicted rewards corresponding to the recommended tasks. The task scheduling system 102 thus utilizes the reinforcement learning model to intelligently modify the schedule during the time period.

In one or more embodiments, the server device(s) 104 include a variety of computing devices, including those described below with reference to FIG. 11. For example, the server device(s) 104 includes one or more servers for storing and processing data associated with digital schedules and digital task management. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 13. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, analyzing, and interacting with a digital calendar/schedule via the digital scheduling application 112. The client device 106 also performs functions for generating, capturing, or accessing data to provide to the digital calendar system 110 and the task scheduling system 102 in connection with generating and modifying digital calendars. For example, the client device 106 communicates with the server device(s) 104 via the network 108 to provide task information, user account information, user preferences and other constraints, and selections of tasks/calendars. Although FIG. 1 illustrates the system environment 100 with a single client device 106, the system environment 100 can include a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 11.

Although FIG. 1 illustrates the server device(s) 104 and the client device 106 communicating via the network 108, in alternative embodiments, the various components of the task scheduling system 102 communicate and/or interact via other methods (e.g., the server device(s) 104 and the client device 106 can communicate directly). Furthermore, although FIG. 1 illustrates the task scheduling system 102 being implemented by a particular component and/or device within the system environment 100, the task scheduling system 102 can be implemented, in whole or in part, by other computing devices and/or components in the system environment 100 (e.g., the client device 106). Additionally, the server device(s) 104 and/or the client device 106 may access task or calendar information from a third-party system via the network 108.

Figure 2:
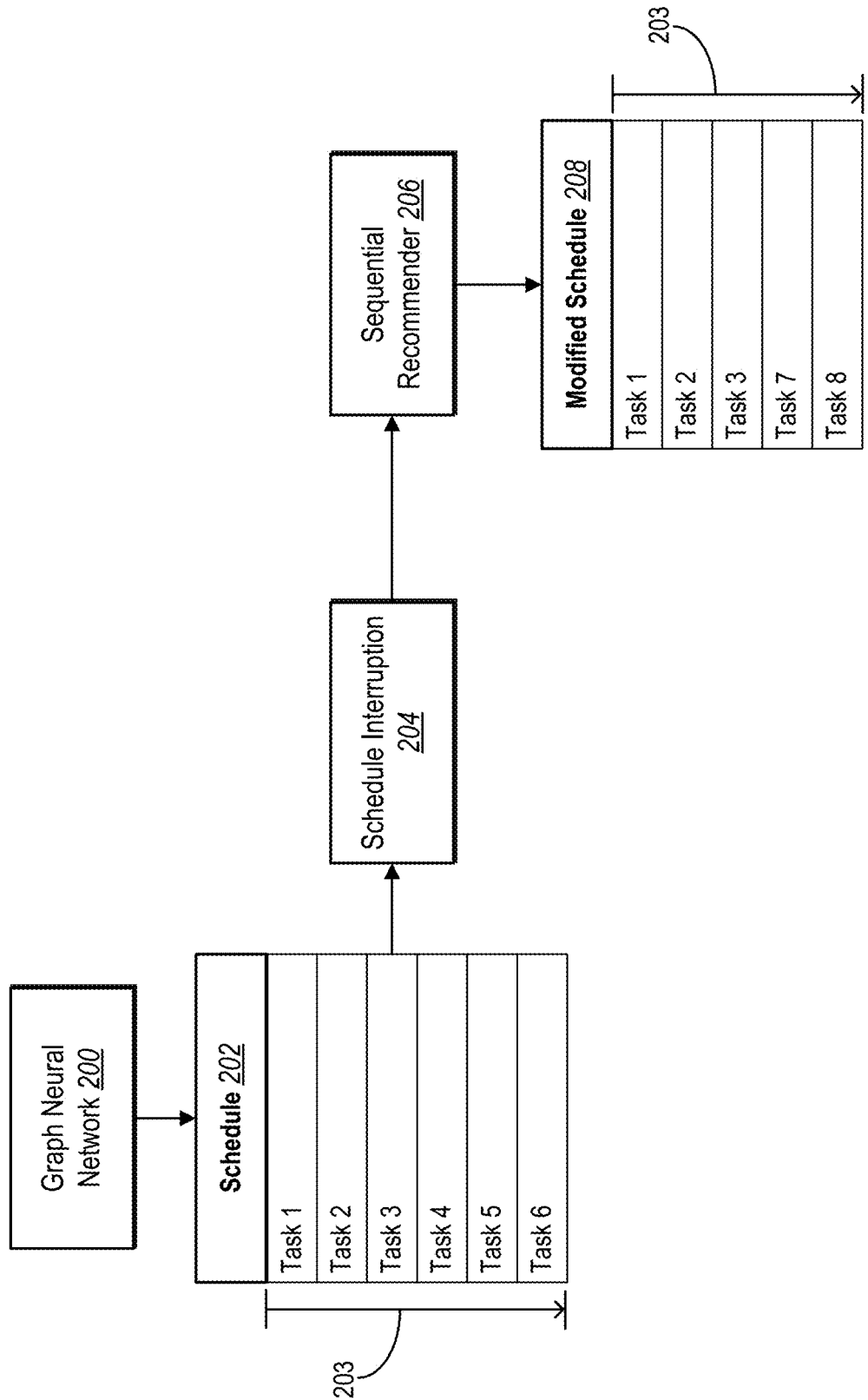
FIG. 2 illustrates an overview of a process for determining and modifying a schedule in accordance with one or more implementations.

In one or more embodiments, the task scheduling system 102 flexibly, accurately, and efficiently generates and modifies schedules including ordered sequences of tasks for users. FIG. 2 illustrates an overview of the task scheduling system 102 generating and modifying a schedule. Specifically, FIG. 2 illustrates modifying the schedule utilizing intelligent task recommendations in response to detecting a modification to the schedule.

As previously described, the task scheduling system 102 includes a graph neural network 200 that uses information about users and candidate tasks to determine a set of tasks for generating schedules for users. For example, FIG. 2 illustrates that the task scheduling system 102 utilizes the graph neural network 200 to generate a schedule 202 for a particular user including a plurality of tasks in an ordered sequence of the tasks. Specifically, the task scheduling system 102 generates the schedule 202 for a time period 203 with a start time and an end time. Accordingly, the ordered sequence of tasks corresponding to the schedule fits within the time period 203.

In one or more embodiments, the task scheduling system 102 generates the schedule 202 in response to a request to generate the schedule 202. For example, the task scheduling system 102 generates the schedule 202 prior to the start time of the time period 203 in accordance with a user request to generate the schedule 202. Alternatively, the task scheduling system 102 generates the schedule 202 prior to the start time of the time period 203 in accordance with a regular scheduling process. For instance, the task scheduling system 102 may determine that the user is associated with a user preference to generate a new schedule every day (or other specified time period).

According to one or more embodiments, the task scheduling system 102 selects the task set (e.g., "Task 1," "Task 2," . . . "Task 6") to fill the schedule 202 from a plurality of candidate tasks. For instance, the task scheduling system 102 utilizes the graph neural network 200 to select the task set from a plurality of candidate task sets. More specifically, the task scheduling system 102 utilizes the graph neural network 200 to predict a performance efficiency score for each set of candidate tasks. The task scheduling system 102 utilizes the predicted performance efficiency scores to select a given task set (e.g., a task set with the highest predicted performance efficiency score) for generating the schedule 202.

The task scheduling system 102 then generates the schedule 202 by ordering the tasks in the selected task set according to a sequence that corresponds to the time period 203. To illustrate, the task scheduling system 102 determines the sequence according to a plurality of time slots within the time period and one or more constraints associated with the tasks or user. For instance, the task scheduling system 102 determines the sequence according to temporal constraints or priorities associated with the tasks indicating to assign certain tasks before other tasks. Additionally, the task scheduling system 102 determines the sequence according to time or availability constraints that tie tasks to specific times and/or availability of a plurality of users.

As illustrated in FIG. 2, the task scheduling system 102 detects a schedule interruption 204 in connection with the schedule 202. Specifically, the task scheduling system 102 detects performance of a task out of the sequence of the schedule 202. For example, the task scheduling system 102 detects performance of a task in the selected task set of the schedule 202 out of order (e.g., performing "Task 4" before detecting performance of "Task 3"). Alternatively, the task scheduling system 102 receives an explicit request to modify the schedule 202 by a user (e.g., a request from a client device of the user).

In one or more embodiments, after detecting the schedule interruption 204, the task scheduling system 102 modifies the schedule 202 utilizing information about the user, tasks, and historical data associated with the user and/or tasks. As illustrated in FIG. 2, the task scheduling system 102 utilizes a sequential recommender 206 to generate a modified schedule 208 in response to the schedule interruption 204. For instance, the task scheduling system 102 utilizes the sequential recommender 206 to determine one or more new sets of candidate tasks (e.g., new sequences that differ from the sequence in the schedule 202) based on the information about the user, tasks, and/or historical data.

As further illustrated in FIG. 2, the modified schedule 208 includes a different sequence of tasks than the schedule 202 originally determined by the task scheduling system 102. Specifically, the task scheduling system 102 generates the modified schedule 208 to include a subset of tasks (e.g., "Task 7" and "Task 8") that correspond to the remainder of the time period 203 associated with the schedule 202. Accordingly, the task scheduling system 102 generates the modified schedule 208 to correspond to the same time period 203 before and after modification. For instance, the modified schedule 208 includes the subset of tasks that corresponds to the same amount of time as a subset of tasks (e.g., "Task 4," "Task 5," and "Task 6") in the schedule 202 that were uncompleted due to the schedule interruption 204. In some implementations, the subset of tasks in the modified schedule 208 corresponds to an amount of time that is less than or equal to the subset of tasks in the initial schedule 202.

Figure 3A:
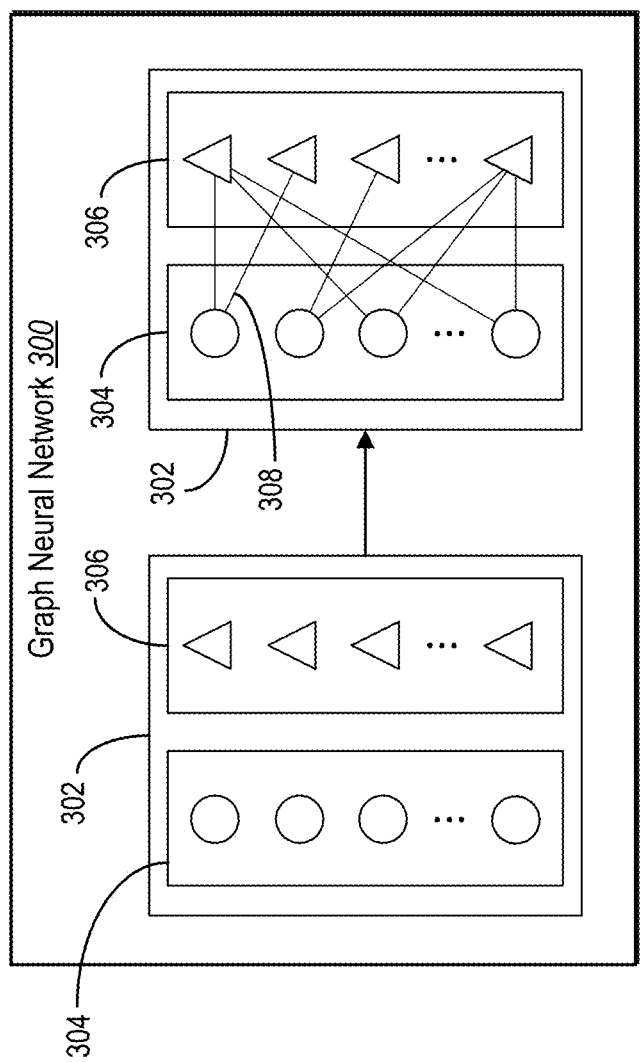
FIG. 3A illustrates a diagram of graph neural network processing a bipartite graph in accordance with one or more implementations.

FIG. 3A illustrates an embodiment of a graph neural network 300 that the task scheduling system 102 utilizes to determine performance efficiency scores of task sets. In one or more embodiments, as shown in FIG. 3A, the graph neural network 300 includes a bipartite graph 302 including a set of user nodes 304 and a set of task nodes 306. Specifically, the set of user nodes 304 corresponds to a plurality of users of the task scheduling system 102. Additionally, the set of task nodes 306 corresponds to a plurality of tasks that the task scheduling system 102 has identified for scheduling. To illustrate, the plurality of tasks includes actions/activities involving a single user such as working out, reading, working, etc., or actions/activities involving more than one user such as meetings, events, etc.

In one or more embodiments, the task scheduling system 102 trains the graph neural network 300 to capture dependencies among the nodes in the bipartite graph 302. For instance, the task scheduling system 102 utilizes the graph neural network 300 to generate a plurality of edges (e.g., edge 308) between the set of user nodes 304 and the set of task nodes 306 (e.g., a plurality of tasks connected to a particular user). In particular, the graph neural network 300 captures edge weights between user nodes and task nodes to make predictions of performance efficiency scores indicating a difference between completed and uncompleted tasks in a given set of tasks for each particular user.

According to one or more embodiments, the task scheduling system 102 determines the edges between the set of user nodes 304 and the set of task nodes 306 in the bipartite graph 302 based on training data. For instance, the training data includes historical scheduling data associated with a plurality of users corresponding to the set of user nodes 304. In some additional embodiments, the training data includes scheduling data associated with groups of users (e.g., users of similar demographics or attributes). Accordingly, the task scheduling system 102 trains the graph neural network 300 to learn the edge weights in the bipartite graph 302 based on training data for individual users or for groups of users.

In one or more embodiments, the graph neural network 300 includes a convolutional neural network represented as $H^{(l)}=\sigma(\hat{A}H^{(l-1)}W^{(l)})$ in which $W^{(l)}$ represents a model parameter in the $l_{th}$ layer, $H^{(l)}$ represents the hidden features of nodes in the $l_{th}$ layer, and $\hat{A}$ represents the connection (e.g., edge weight) between different nodes. For example, a non-zero value of $\hat{A}_{i,j}$ indicates an existing edge between the $i_{th}$ node and the $j_{th}$ node. By utilizing $\hat{A}$, $H^{(l)}$ aggregates information from its neighbors to capture the dependence between different nodes.

Furthermore, in one or more embodiments, the graph neural network 300 includes a final layer that generates predictions based on node representations $H^{(l)}$ as $\hat{Y}=H^{(L)}W$ in which $\hat{Y}$ represents the prediction result (e.g., a performance efficiency score), and W is the model parameter for prediction. Thus, the task scheduling system 102 trains the graph neural network 300 by comparing the prediction result and a ground-truth value to generate a loss function for the graph neural network 300. For example, the task scheduling system 102 determines a ground-truth value by measuring completion of tasks in a given set of tasks in a schedule and determining a ground-truth performance efficiency score for the set of tasks. The task scheduling system 102 thus compares the predicted performance efficiency score to the ground-truth performance efficiency score. Additionally, the task scheduling system 102 utilizes the loss function to learn model parameters of the graph neural network 300 (e.g., by fine-tuning the edge weights).

In one or more embodiments, after training the graph neural network 300 utilizing the bipartite graph 302, the task scheduling system 102 utilizes the graph neural network 300 to generate a performance efficiency score for an arbitrary task set for a user. In particular, the task scheduling system 102 determines that a task t is something that needs to be accomplished within a specified time (e.g., based on an earliest possible start time and a latest possible end time). Additionally, in some embodiments, each task is associated with a priority determined by a number or a set value (e.g., "High," "Medium," and "Low"). Furthermore, as mentioned, the task scheduling system 102 determines constraints as a temporal relationship between different tasks, such as "Task 1">"Task 2" indicates that "Task 1" must precede "Task 2."

Figure 3B:
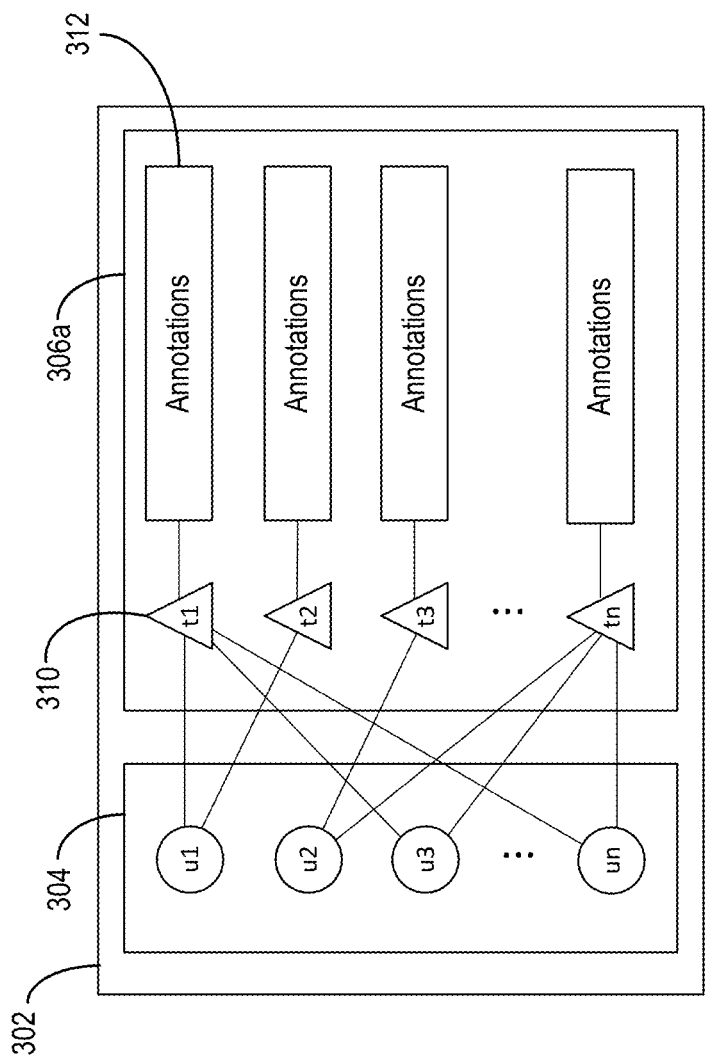
FIG. 3B illustrates a diagram of a bipartite graph including connected sets of user nodes and task nodes in accordance with one or more implementations.

In one or more embodiments, the task scheduling system 102 utilizes context information to further determine edge weights in a graph neural network. Specifically, FIG. 3B illustrates the bipartite graph 302 including the set of user nodes 304 and a set of task nodes 306a including additional context information. More specifically, the set of task nodes 306a includes annotations for task nodes that include additional context information for tasks in the plurality of tasks.

To illustrate, the set of task nodes 306a of the bipartite graph 302 includes a task node 310 corresponding to a particular task. Additionally, as illustrated in FIG. 3B, the task node 310 includes annotations 312 that provide context information for the task associated with the task node 310. For example, the annotations include information that distinguishes the task node 310 from other task nodes associated with similar tasks. As an example, the task scheduling system 102 annotates a first task node associated with a meeting task to include first context information such as a first day of the week and a second task node associated with a meeting task to include second context information such as a second day of the week. The task scheduling system 102 thus distinguishes between the first task node and the second task node according to the different context information for each corresponding task.

In one or more embodiments, the task scheduling system 102 determines a schedule S as an entry (e.g., in a calendar application) including a set of tasks and the scheduled time for each task for user u. The task scheduling system 102 also determines context information including, but not limited to, weather, day of the week, season, etc., represented as $\{C_{weather}, C_{DayOfWeek}, C_{season}, \text{etc.}\}$, such that:

$$S=\{u,[t_1:\text{time}_1, t_2:\text{time}_2, \ldots, t_n:\text{time}_N],[C_{Weather}, C_{DayOfWeek}, C_{Season}, \text{etc.}]\}.$$

Furthermore, in one or more embodiments, the task scheduling system 102 defines a task set T as a set of tasks $T=\{t_1, t_2, \ldots, t_N\}$. Thus, for a given user u, the task scheduling system 102 determines that a feasible task set $T_u$ as the set of all feasible (e.g., candidate) tasks for that user. In some embodiments, the task scheduling system 102 determines the candidate tasks based on the user's historical schedule completion data or based on user input (e.g., for an initial schedule). Accordingly, for a schedule for user u, the associated task set is a subset of $T_u$.

For a set of tasks of schedule S, the task scheduling system 102 determines the performance efficiency score as the sum of completed tasks minus uncompleted tasks. Additionally, in one or more embodiments, the task scheduling system 102 weights each task by their priorities:

$$y_S = \sum_{t_i \in S_c} P(t_i) - \sum_{t_j \in S_u} P(t_j)$$

in which $y_s$ represents the performance efficiency score for the schedule S, $S_c$ represents the completed set of tasks in S, $S_u$ represents the set of uncompleted tasks in S, t is a task in S, and P(t) is the priority (e.g., numeric priority) of t. Accordingly, given a set of tasks with priorities and constraints, the task scheduling system 102 determines an optimized sequence for performing the tasks during a specific time period. In one or more embodiments, the task scheduling system 102 determines the priorities or other constraints based on selected or predetermined priorities or based on learned parameters of the graph neural network. Accordingly, the task scheduling system 102 provides flexibility in determining task priorities based on explicit user input or learning the priorities according to a user's activity history.

Figure 4:
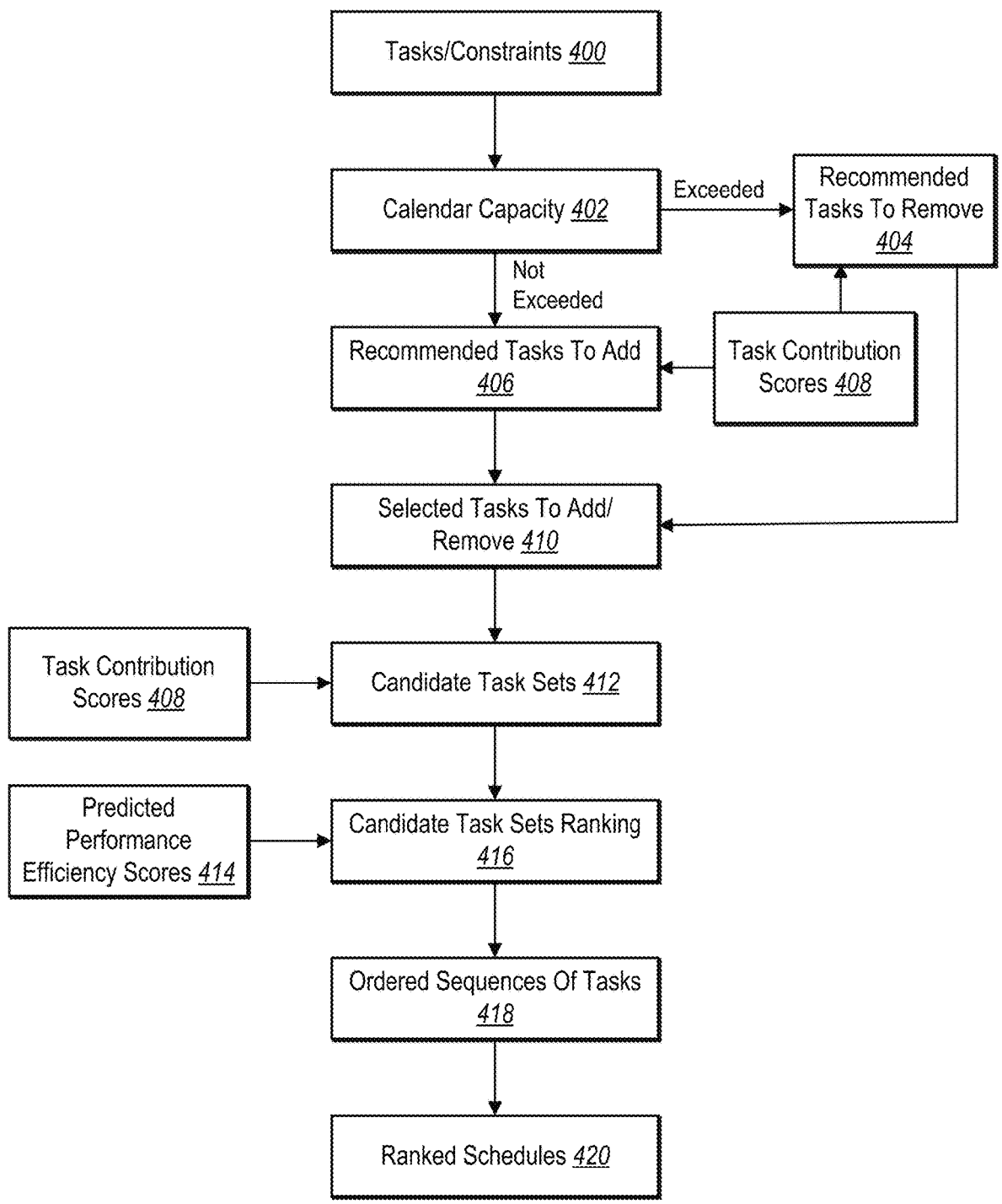
FIG. 4 illustrates a diagram of a process for determining a schedule of tasks in accordance with one or more implementations.

In addition to determining task sets based on performance efficiency scores associated with the task sets, in one or more embodiments, the task scheduling system 102 also utilizes information about the contribution of individual tasks to the performance efficiency scores to determine the task sets. For example, FIG. 4 illustrates a diagram in which the task scheduling system 102 determines one or more schedules based on one or more task sets. In particular, in one or more embodiments, the task scheduling system 102 utilizes predicted performance efficiency scores in addition to task contribution scores to determine the schedule(s) of task set(s) for a user.

As illustrated in FIG. 4, the task scheduling system 102 first determines tasks/constraints 400 associated with a user. For example, as previously indicated, the task scheduling system 102 determines a plurality of candidate tasks for the user based on previous scheduling data associated with the user or based on explicit user input. Additionally, the task scheduling system 102 determines one or more constraints associated with the tasks and/or user. To illustrate, the task scheduling system 102 determines temporal constraints between tasks (e.g., via the graph neural network, via previous schedules, or via user-defined temporal constraints), user preferences associated with the user, scheduling conflicts associated with the user, other users involved in the tasks, etc. Specifically, modifying a schedule of one user can affect schedules of a plurality of users.

After determining tasks/constraints 400, FIG. 4 illustrates that the task scheduling system 102 determines a calendar capacity 402 associated with a user. In one or more embodiments, the task scheduling system 102 determines whether one or more time periods associated with a digital calendar of the user have room for scheduling tasks. For example, the task scheduling system 102 determines a start time and an end time to the time period(s) and then determines whether one or more candidate tasks are compatible with the time period(s) based on the start time and end time. Additionally, in some embodiments, the task scheduling system 102 determines whether the available time period(s) include breaks.

In response to determining that the calendar capacity 402 is exceeded, FIG. 4 illustrates that the task scheduling system 102 optionally provides recommended tasks to remove 404. In particular, in response to determining that an estimated time to complete a task set exceeds the calendar capacity 402 (e.g., based on the total time), the task scheduling system 102 provides a recommendation of one or more tasks to remove from the task set. To illustrate, the task scheduling system 102 selects one or more tasks to remove from a current task set based on data associated with each task in the current task set. In one or more embodiments, the task scheduling system 102 utilizes task contribution scores 408 corresponding to a plurality of tasks.

Specifically, the task scheduling system 102 generates a task contribution score for each task in a plurality of candidate tasks. For instance, the task scheduling system 102 utilizes an inferencer model on top of a graph neural network in an offline mode to determine task contribution scores relative to performance efficiency scores for one or more task sets. Additional detail regarding generating task contribution scores is provided below (e.g., in relation to FIG. 5).

In one or more alternative embodiments, the task scheduling system 102 optionally provides recommended tasks to add to a set of tasks. For instance, in response to determining that the calendar capacity 402 is not exceeded, the task scheduling system 102 determines one or more recommended tasks to add 406 to the set of tasks to fill the remainder of the schedule. In particular, the task scheduling system 102 calculates an amount of time remaining in the schedule (e.g., based on total time or number of time slots). The task scheduling system 102 then determines one or more tasks that fit within the remaining time according to the tasks/constraints 400. Furthermore, in one or more embodiments, the task scheduling system 102 utilizes the task contribution scores 408 to determine tasks to recommend to add to the set of tasks.

After optionally determining the recommended tasks to remove 404 and/or the recommended tasks to add 406, the task scheduling system determines all selected tasks to add/remove 410 in connection with a task set. For instance, in one or more embodiments, the task scheduling system 102 receives one or more requests to remove one or more tasks to remove from a task set. Additionally, in one or more embodiments, the task scheduling system 102 also receives one or more requests to add one or more tasks to a task set. Accordingly, the task scheduling system 102 determines task sets that include at least a partially user-defined subset of tasks with one or more tasks added and/or one or more tasks removed from an initial task set.

In one or more embodiments, the task scheduling system 102 determines candidate task sets 412 for generating a schedule. In particular, the task scheduling system 102 utilizes a task set determined based on the user-defined subset of tasks. In one or more additional embodiments, the task scheduling system 102 automatically determines one or more task sets based on historical data associated with a user. For example, the task scheduling system 102 analyzes a scheduling history of the user to determine frequently performed tasks or high-priority tasks (e.g., based on edge weights associated with specific task nodes in a bipartite graph of a graph neural network). The task scheduling system 102 then generates one or more task sets including the frequently performed tasks or high-priority tasks in addition to any user-defined task sets.

After determining the candidate task sets 412, in one or more embodiments, the task scheduling system 102 generates predicted performance efficiency scores 414 for the candidate task sets. Specifically, the task scheduling system 102 predicts, for each candidate task set, a sum of completed tasks minus uncompleted tasks. Furthermore, the task scheduling system 102 utilizes the predicted performance efficiency scores 414 to generate a candidate task sets ranking. For instance, the task scheduling system 102 ranks the candidate task sets according to the performance efficiency scores 414 (e.g., by ranking a task set with the highest performance efficiency score as the highest ranking task set).

As illustrated in FIG. 4, in one or more embodiments, the task scheduling system 102 generates ordered sequences of tasks 418 from the candidate task sets 412. For example, the task scheduling system 102 utilizes constraints (e.g., the tasks/constraints 400) in addition to any priorities associated with the tasks to determine an order for each of the candidate task sets 412. In some embodiments, the task scheduling system 102 also utilizes contextual information to determine the ordered sequences of tasks 418 by determining that specific tasks must precede other tasks or be performed at specific times, or that certain tasks depend on the availability of other users.

In one or more embodiments, the task scheduling system 102 utilizes the graph neural network to automatically determine temporal sequencing of tasks in task sets (e.g., the ordered sequences of tasks 418). For example, the task scheduling system 102 utilizes the graph neural network to determine task sequences based on relationships corresponding to edge weights between user nodes and task nodes according to historical scheduling data. In alternative embodiments, the task scheduling system 102 utilizes a separate scheduler component that determines task sequences based on user input, previous schedules associated with a user, scheduling data associated with one or more other users, etc.

Furthermore, as illustrated in FIG. 4, the task scheduling system 102 determines ranked schedules 420 to provide to a user for selection. For instance, the task scheduling system 102 utilizes a scheduler (e.g., a software component) that ranks a plurality of schedules including the ordered sequences of tasks 418 based on constraints or other data. In one or more embodiments, the task scheduling system 102 utilizes the ranked schedules 420 to select a predetermined number of schedules (e.g., the top-k schedules).

To illustrate, the task scheduling system 102 determines a ranked list of candidate schedules by determining whether each schedule meets a constraint associated with a user. For example, the task scheduling system 102 determines that a particular constraint indicates that a schedule has a given task in a first position in a task sequence (or first task type). The task scheduling system 102 thus ranks each of the candidate schedules based on whether the candidate schedules have the given task in the first position. The task scheduling system 102 thus rank the candidate schedules based on whether the schedules meet a plurality of constraints, how many of the constraints the schedules meet, based on a priority of each of the constraints, etc.

As mentioned, in one or more embodiments, the task scheduling system 102 utilizes an offline model including a graph neural network and an inferencer model to generate the predicted performance efficiency scores 414 and the task contribution scores 408, respectively. In one or more embodiments, the task scheduling system 102 utilizes the graph neural network to determine a plurality of edge weights between user nodes and task nodes. The task scheduling system 102 then utilizes the graph neural network to generate predicted performance efficiency scores for a plurality of different task sets based on the edge weights. The task scheduling system 102 also utilizes the inferencer model to generate the task contribution scores 408 based on the generated performance efficiency scores for the plurality of task sets. When determining the predicted performance efficiency scores 414 for the candidate task sets 412, the task scheduling system 102 selects the previously generated predicted performance efficiency scores for the task sets.

In one or more alternative embodiments, the task scheduling system 102 determines estimated task contribution scores for a plurality of task nodes based on historical data for the task nodes and a user. The task scheduling system 102 utilizes the estimated task contribution scores to provide the recommended tasks to remove 404 and the recommended tasks to add 406. After determining the candidate task sets based on the estimated task contribution scores, the task scheduling system 102 then utilizes the graph neural network to generate the predicted performance efficiency scores 414. In some embodiments, the task scheduling system 102 then utilizes the predicted performance efficiency scores 414 to update the edge weights and task contribution scores for providing task recommendations for future task sets.

While FIG. 4 illustrates an embodiment of the task scheduling system 102 that provides recommendations of tasks to determine candidate task sets, in alternative embodiments, the task scheduling system 102 does not provide task recommendations. Instead, the task scheduling system 102 automatically determines all of the candidate task sets based on historical scheduling data associated with a user. In some embodiments, the task scheduling system 102 also provides options to a user to provide task recommendations, to automatically generate task sets, or a combination of both.

Figure 5:
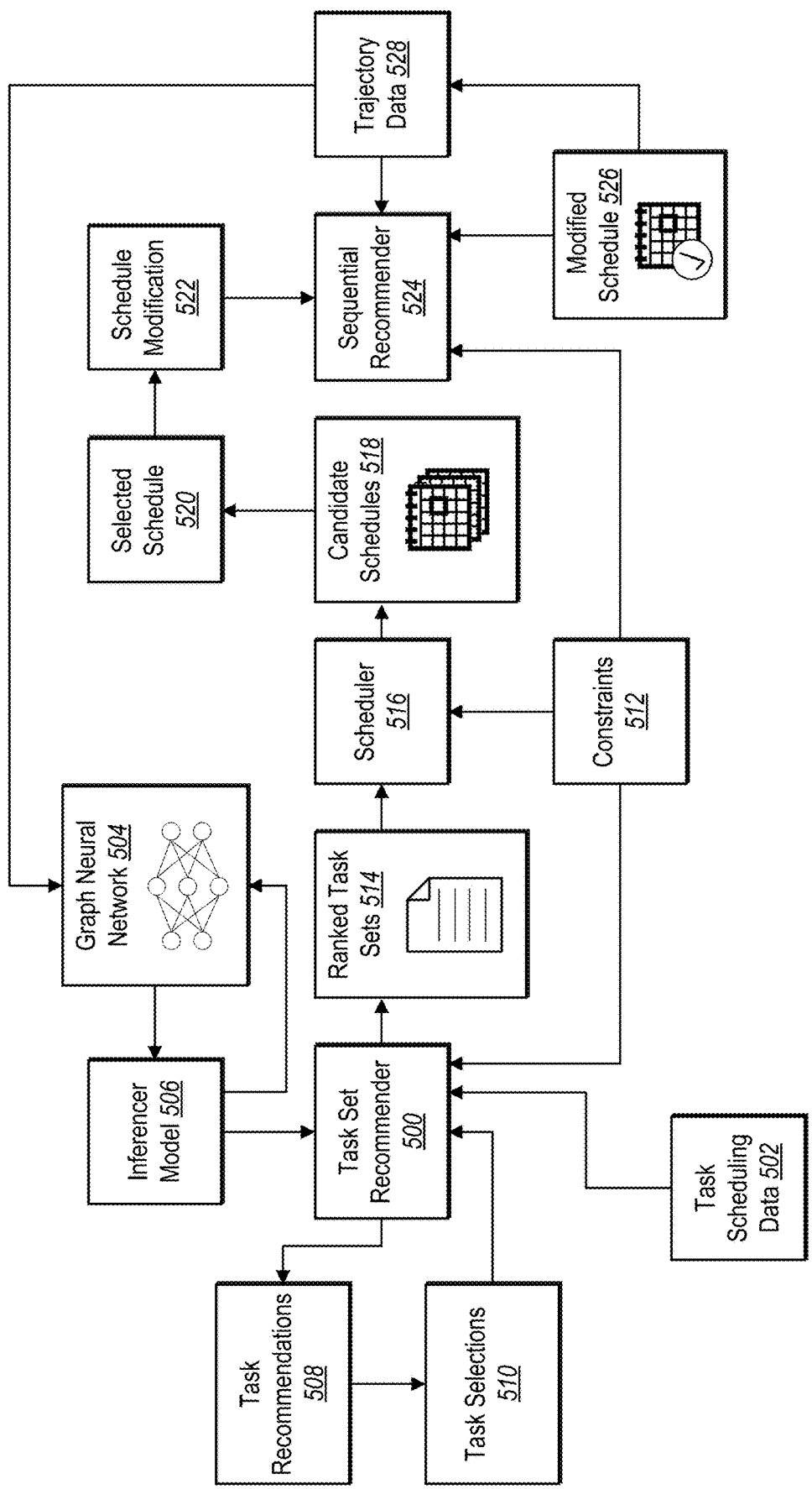
FIG. 5 illustrates a diagram of a process for determining a schedule of an ordered sequence of tasks and modifying the schedule utilizing a graph neural network and reinforcement learning in accordance with one or more implementations.

As briefly mentioned, in one or more embodiments, the task scheduling system 102 combines an offline model and an online model to intelligently generate schedules and modify schedules for users. FIG. 5 illustrates that the task scheduling system 102 utilizes offline modeling (e.g., a graph neural network and an inferencer model) and online modeling (e.g., a sequential recommender with reinforcement learning) to intelligently generate and modify schedules. Specifically, the task scheduling system 102 first generates a schedule for a time period and then modifies the schedule based on an interruption to the schedule.

FIG. 5 illustrates that the task scheduling system 102 includes a task set recommender 500 to provide recommended tasks to a user (e.g., via a client device). Specifically, FIG. 5 illustrates that the task scheduling system 102 receives task scheduling data 502 including, but not limited to, a plurality of candidate tasks, a time period for scheduling tasks, and user information. In one or more embodiments, the task set recommender 500 provides recommendations of tasks to add to one or more task sets from the plurality of candidate tasks in the task scheduling data 502.

In one or more additional embodiments, the task scheduling system 102 utilizes a graph neural network 504 to determine dependencies between nodes in a bipartite graph of user nodes and task nodes. In particular, as mentioned, the task scheduling system 102 determines edge weights between nodes that indicate the dependencies between nodes based on schedule history data for a plurality of users. Additionally, the graph neural network 504 generates performance efficiency scores that indicate the predicted performance of tasks in a given task set. For instance, the graph neural network 504 determines the difference between estimated tasks completed and estimated tasks uncompleted for the task set.

FIG. 5 illustrates that the task scheduling system 102 also utilizes an inferencer model 506 on top of the graph neural network 504 to determine task contribution scores for tasks in a task set. To illustrate, the task scheduling system 102 utilizes the inferencer model 506 to perform a backpropagation step of a final layer in the graph neural network 504 that generates the performance efficiency scores. In particular, the inferencer model 506 calculates the norm of associated weights (e.g., edge weights in a bipartite graph) for each task node as the task contribution score for the corresponding task.

For example, the inferencer model 506 determines edge weights between a particular user node and a plurality of task nodes and then normalizes the edge weights to determine the task contribution scores for the plurality of task nodes. In one or more additional embodiments, the inferencer model 506 combines (e.g., sums or averages) a plurality of edge weights between each task node and a plurality of user nodes. The inference model 506 then normalizes the combination of edge weights for a given task node to determine the task contribution score for the task node.

In one or more embodiments, as illustrated in FIG. 5, the task set recommender 500 optionally provides task recommendations 508 based on the performance efficiency scores for task sets and task contribution scores generated via the graph neural network 504 and the inferencer model 506. For example, the task set recommender 500 provides recommendations of individual tasks for a user to add to a set of tasks. Alternatively, the task set recommender 500 provides one or more recommendations of tasks to remove from a set of tasks. The task scheduling system 102 also receives task selections 510 based on the task recommendations 508 and provides the task selections 510 to the task set recommender 500. The task set recommender 500 can utilize the task selections 510 to further inform future task recommendations.

In some embodiments, the task scheduling system 102 utilizes constraints 512 to determine ranked task sets 514 utilizing the task set recommender 500. For instance, the task scheduling system 102 determines one or more task sets of the ranked task sets 514 based on automatically recommended task sets or user-defined task sets provided by the task set recommender 500. Additionally, the ranked task sets 514 include rankings of a plurality of task sets in accordance with the performance efficiency scores, the task contribution scores, and/or the constraints 512. For example, the task scheduling system 102 ranks task sets based on how well the task sets meet the constraints.

The task scheduling system 102 then utilizes a scheduler 516 to generate candidate schedules 518 from the ranked task sets 514. For example, the task scheduling system 102 utilizes the scheduler 516 to generate ordered sequences of tasks from the ranked task sets 514. In one or more embodiments, the task scheduling system 102 also determines specific times for each task in the ordered sequences of tasks according to one or more time periods associated with the user. For example, the task scheduling system 102 utilizes the scheduler 516 to determine whether specific tasks need to be performed at certain times during a time period (e.g., in the morning) or with one or more other users. The task scheduling system 102 also determines whether a task has a temporal relationship with one or more other tasks (e.g., a first task can only be performed after a second task). The task scheduling system 102 can utilize the scheduler 516 to arrange each task by identifying those tasks that satisfy these conditions and/or by ranking the tasks according to one or more scores (e.g., according to task contribution scores). Furthermore, the task scheduling system 102 generates the candidate schedules 518 to include a plurality of schedules ranked according to the ranked task sets 514 to select a predetermined number of schedules (e.g., based on a threshold k-number of schedules) to provide to a user.

In one or more embodiments, the task scheduling system 102 receives a selected schedule 520 from the candidate schedules 518 and then implements the selected schedule 520 for the user. For example, the task scheduling system 102 stores the selected schedule 520 in connection with a calendar application. As illustrated in FIG. 5, the task scheduling system 102 receives a schedule modification 522 during a time period associated with the selected schedule 520. To illustrate, as previously mentioned, the task scheduling system 102 detects an interruption to the ordered sequence of tasks in the selected schedule 520 such as a new task, a missed task, or other unexpected event (e.g., unavailability of a required user for a task).

Based on the schedule modification 522, the task scheduling system 102 utilizes a sequential recommender 524 to modify the selected schedule 520. For instance, the sequential recommender 524 utilizes the constraints 512 to provide one or more recommendations of tasks or task sequences for modifying the schedule based on the remaining amount of time in the time period. In one or more embodiments, the sequential recommender 524 utilizes reinforcement learning to adjust the selected schedule 520 and generate a modified schedule 526 with a modified sequence of tasks. More specifically, the modified schedule 526 includes one or more tasks that replace one or more tasks from the selected schedule 520 at or after a time of the schedule modification 522.

In one or more embodiments, the task scheduling system 102 utilizes scheduling data from the modified schedule 526 to further inform task recommendations and schedule generation. For example, as illustrated in FIG. 5, the task scheduling system 102 determines trajectory data 528 based on historical tasks and actions taken by a user in connection with the sequential recommender 524 and the modified schedule 526. The task scheduling system 102 provides the trajectory data 528 to the sequential recommender 524 to modify future schedules in response to detected interruptions. In one or more embodiments, the task scheduling system 102 also provides the trajectory data 528 to the graph neural network 504 to update edge weights between user nodes and task nodes in a bipartite graph. Thus, the task scheduling system 102 continually improves schedule generation for users based on the tasks recommended to users and actions taken by the users based on those recommendations.

In one or more embodiments, although FIG. 5 illustrates that the task scheduling system 102 utilizes various components to generate and modify schedules, respectively, the task scheduling system alternatively utilizes one or more other components to generate and/or modify schedules for a user. For example, the task scheduling system 102 utilizes the graph neural network 504 and the inferencer model 506 to directly generate the ranked task sets 514 and/or the candidate schedules 518. In one or more additional embodiments, the task scheduling system 102 does not provide recommendations of tasks to a user. Furthermore, in some embodiments, the task scheduling system 102 provides the candidate schedules 518, constraints 512, and/or user inputs (e.g., task selections 510, selected schedule 520) to the graph neural network 504 to further update the edge weights between user nodes and task nodes.

Figure 6:
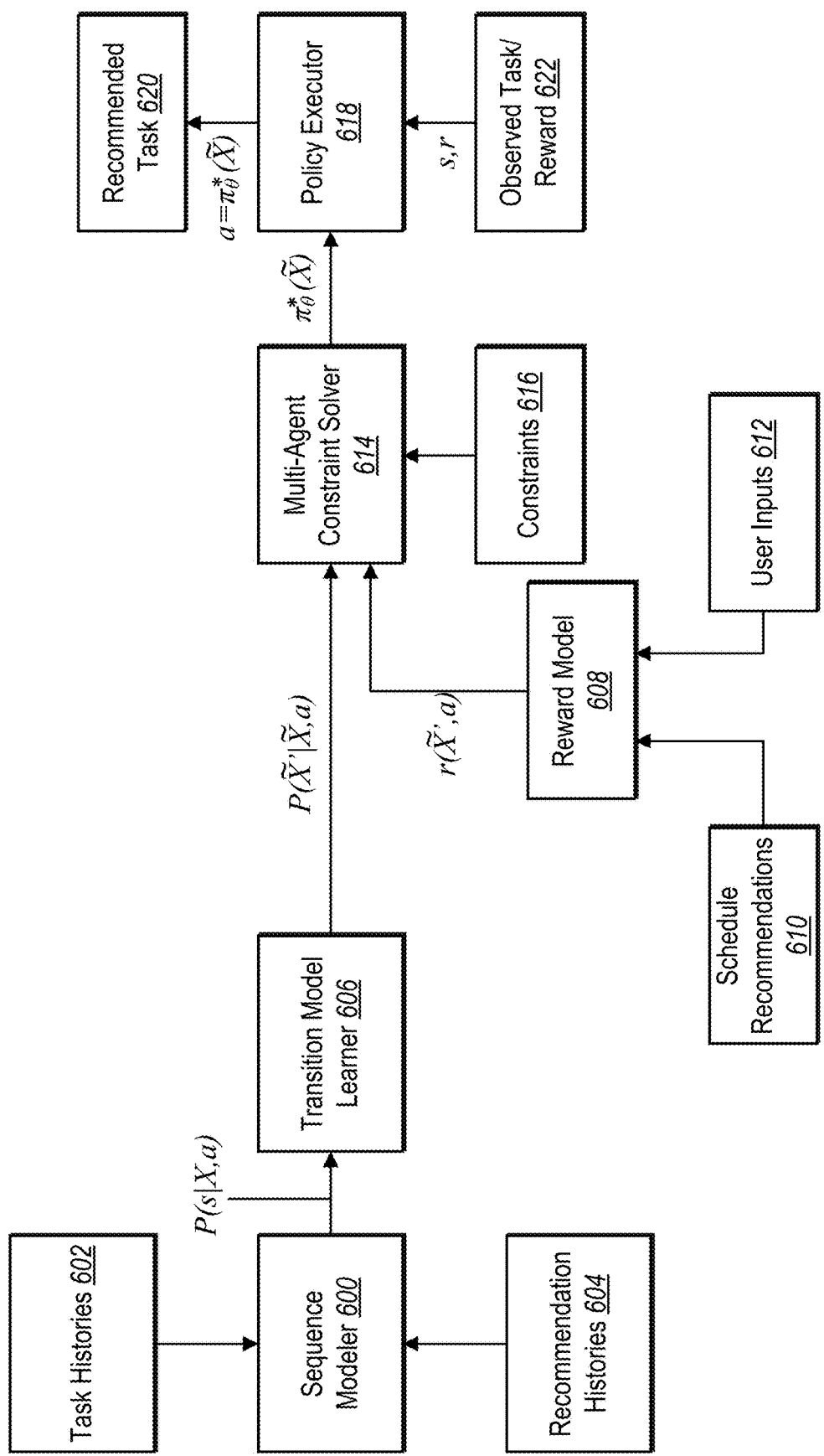
FIG. 6 illustrates a diagram of a model of a sequential recommender in accordance with one or more implementations.

FIG. 6 provides a detailed diagram of a reinforcement learning model (e.g., the sequential recommender 524 of FIG. 5). For example, the reinforcement learning model produces contingent plans for replanning a scheduled time period based on an interruption during the time period and learning from additional information (e.g., user decision) in real-time. According to one or more embodiments, the reinforcement learning model learns latent features associated with a user including the propensity of the user to accept a recommendation of a task. Additionally, in one or more embodiments, the task scheduling system 102 utilizes the reinforcement learning model to incorporate a plurality of objectives and constraints in task recommendation.

For example, the reinforcement learning model includes a sequence modeler 600 to learn sequential information based on historical information associated with a user. In one or more embodiments, the sequence modeler 600 learns sequence data from task histories 602 and corresponding recommendation histories 604 associated with a user. More specifically, the task histories 602 include tasks completed, and the recommendation histories 604 include tasks/actions recommended. The sequence modeler 600 uses the sequence data to determine a probability $P(s|x, a)$ of a user performing a particular task given a task recommendation and a history of tasks completed up until that point (e.g., a previous task sequence). To illustrate, the sequence modeler 600 utilizes a probabilistic suffix tree to perform sequence indexing on the task histories 602 and recommendation histories 604 to determine the probability of the user performing a particular task. In some embodiments, in the absence of sufficient historical data, the task scheduling system 102 utilizes thresholding to determine probabilities of a plurality of different subsequent actions (e.g., 90% chance of following the next recommendation and a 10% chance of a different action). The sequence modeler thus learns the tendencies of a user to perform certain actions based on previous actions and recommendations provided to the user.

Additionally, the reinforcement learning model includes a transition model learner 606 that utilizes the learned sequence data from the sequence modeler 600 to build a truncated history. In particular, the transition model learner 606 utilizes the probabilities generated by the sequence modeler 600 to generate a transition model. In particular, the transition model learner 606 determines the probability $P(\tilde{X}, \tilde{X}, a)$ of a history of actions resulting in a new history of actions (e.g., history of actions plus a new action) based on a particular recommendation.

For example, the reinforcement learning model includes a reward model 608 that generates a reward function associated with certain recommendations based on the current history of tasks in the current schedule. To illustrate, FIG. 6 illustrates that the reward model 608 utilizes schedule recommendations 610 including a plurality of candidate task sequences (e.g., possible subsequent tasks and actions for scheduling) to determine a reward function $r(\tilde{X}, a)$ based on user inputs 612 (e.g., user choices). For example, the reward model 608 utilizes sequences of tasks from task sets determined using a graph neural network (e.g., based on performance efficiency scores corresponding to task sets including the sequences of tasks). More specifically, the schedule recommendations 610 include one or more candidate sequences including tasks from one or more task sets/schedules that have high performance efficiency scores as alternatives to a task set corresponding to a current schedule. In one or more embodiments, the reward model 608 determines a reward associated with each candidate sequence based on each task completed in a sequence, whether the next action in a given sequence is completed, whether all tasks in a sequence are completed, whether the tasks are completed in order, number of completed tasks so far minus remaining uncompleted tasks, etc. Thus, a particular action has an associated reward based on the reward model 608.

FIG. 6 illustrates that the reinforcement learning model includes a multi-agent constraint solver 614 that determines a policy $\pi^*_\theta(\tilde{X})$ based on the truncated history from the transition model learner 606 and reward function as determined by the reward model 608. For instance, the multi-agent constraint solver 614 includes a Markov decision process having a set of states. In response to a particular recommendation at a particular state, the multi-agent constraint solver 614 determines a subsequent state based on the history of tasks completed so far and the recommendation for the next task. Additionally, in one or more embodiments, the multi-agent constraint solver 614 utilizes constraints related to the tasks or a plurality of users, such as task priorities, user availability, etc. The resulting policy indicates a recommended task given the history so far for the current user to optimize the reward.

FIG. 6 further illustrates that the reinforcement learning model includes a policy executor 618 to execute the policy and generate a recommended task 620 to provide to the user (e.g., a client device of the user). In one or more embodiments, the policy executor 618 generates a plurality of recommended tasks within a sequence of tasks based on the policy. Specifically, the policy executor 618 utilizes the current context (e.g., time of day and next task in a schedule) to attempt to maximize the reward (e.g., total number of tasks for the day, total task value based on number and weight/priority of tasks).

Additionally, in some embodiments, the policy executor 618 generates a plurality of recommendations to provide to the user for selection by the user. The reinforcement learning model also determines an observed task/reward 622 based on the recommended task 620. For instance, the reinforcement learning model determines whether the user completed a recommended task and the corresponding reward.

While FIG. 6 illustrates that the task scheduling system 102 utilizes a reinforcement learning model including various components utilizing certain data, in some embodiments, the task scheduling system 102 utilizes other structures of reinforcement learning models and/or other data. For instance, rather than utilizing data associated with a particular user to generate and implement a policy for providing recommended tasks to the user, in some embodiments, the task scheduling system 102 utilizes task histories, recommendation histories, schedule recommendations, and/or user inputs associated with a plurality of users. To illustrate, the task scheduling system 102 utilizes data associated with groups of similar users (e.g., based on demographics, explicit user groupings) or for similar schedule types (e.g., workday routines, construction schedules).

In one or more embodiments, the task scheduling system 102 leverages reinforcement learning that utilizes sequential recommendations as described in more detail by Frits de Nijs, Georgios Theocharous, Nikos Vlassis, Mathijs M. de Weerdt, and Matthijs T. J. Spaan in "Capacity-aware Sequential Recommendations" in Proceedings of the 17$^{th}$ International Conference on Autonomous Agents and Multiagent Systems in 2018.

Figure 7:
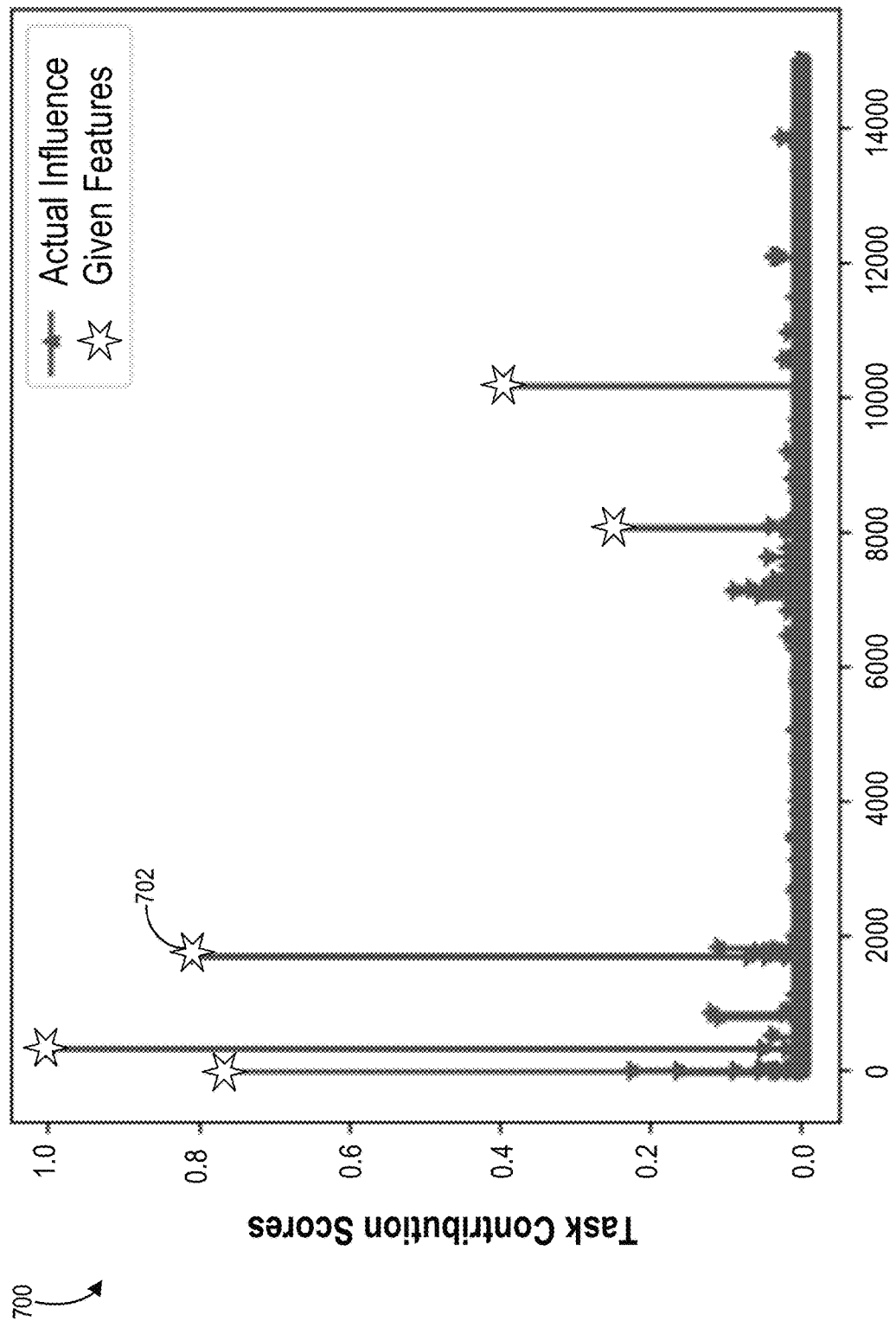
FIG. 7 illustrates a graph diagram of task contribution scores for tasks in accordance with one or more implementations.

As previously mentioned, in one or more embodiments, the task scheduling system 102 determines task contribution scores of tasks to performance efficiency scores of task sets involving the tasks. For example, the task scheduling system 102 utilizes an inferencer model with a graph neural network to determine the contribution of particular features of tasks to performance efficiency scores. FIG. 7 illustrates a graph diagram 700 indicating task contribution scores for individual features of tasks in a task set. Specifically, the x-axis represents the index of features in the given task set, and the y-axis represents the task contribution scores for each feature. In one or more embodiments, a task includes one or more features. Accordingly, the task contribution score for a task can include a combination of task contribution scores for the corresponding features.

In one or more embodiments, the task scheduling system 102 generates the data represented in the graph diagram 700 by processing many different tasks with many different features (e.g., thousands of possible features). By determining the relationship between the features and the task contribution scores of the features, the task scheduling system 102 efficiently determines significant features that result in high performance efficiency scores for task sets. By identifying significant features from many different, the task scheduling system 102 is able to generate predictions for any set of tasks, even for task sets that include tasks not previously processed. The task scheduling system 102 also utilizes the features to make individual recommendations to add or remove tasks to improve a digital schedule.

FIGS. 8A-8H illustrate graphical user interfaces for displaying, modifying, and otherwise interacting with digital calendars and representations of tasks in the digital calendars. Specifically, the task scheduling system 102 communicates with client devices of users to send and receive information associated with generating schedules of task sets for the users based on user input to the client devices. Additionally, the task scheduling system 102 sends and receives information for modifying schedules during time periods associated with the schedules.

Figure 8A:
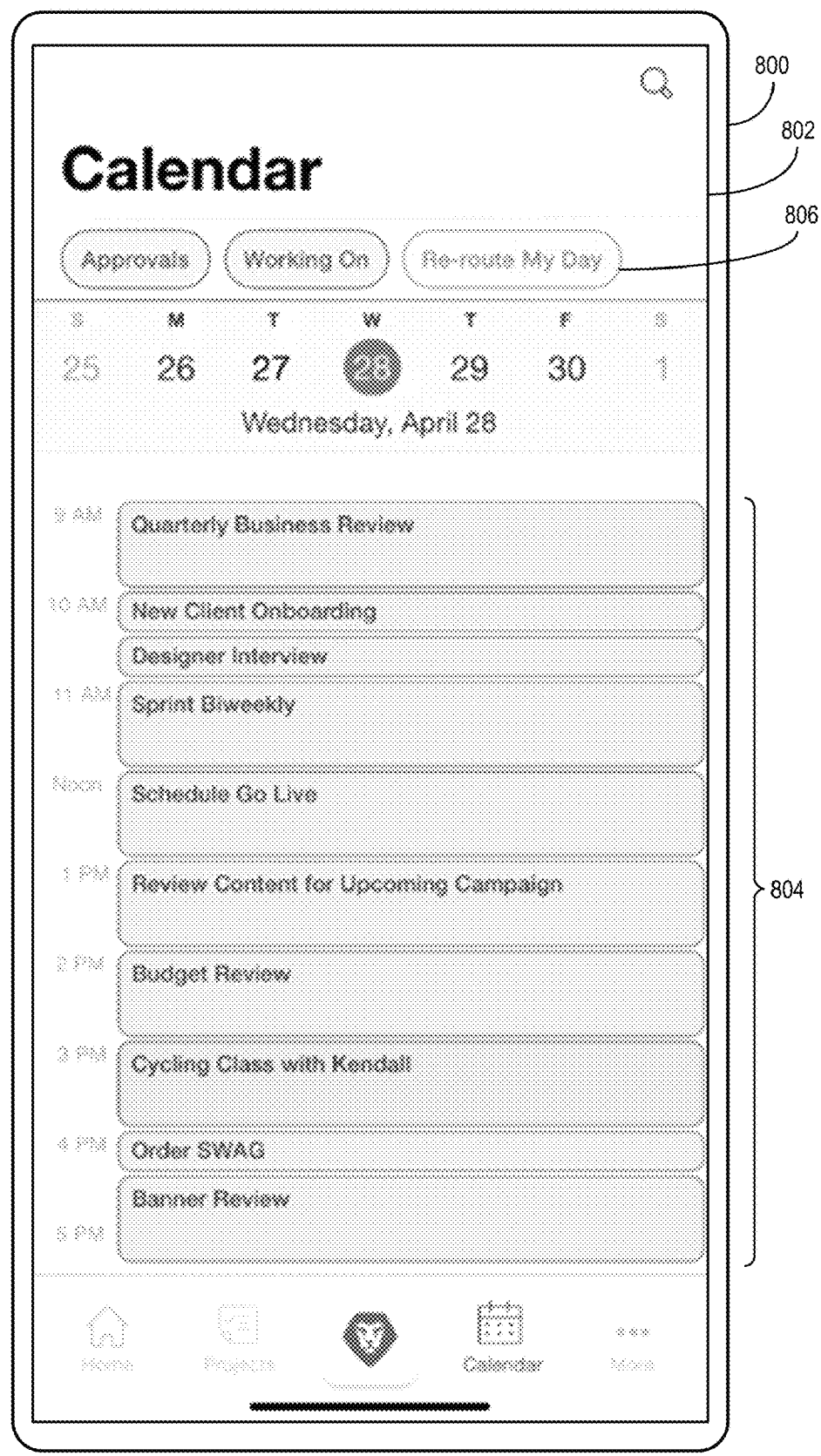
FIGS. 8A-8H illustrate graphical user interfaces for viewing and modifying a schedule in accordance with one or more implementations.

FIG. 8A illustrates a client device 800 displaying a graphical user interface of a digital calendar application 802. In one or more embodiments, the client device 800 provides tools within the digital calendar application 802 to generate digital calendars, view the digital calendars, and/or modify the digital calendars. According to one or more embodiments, in connection with generating and displaying a digital calendar 804 for a user and for a given time period, the client device 800 displays a plurality of tasks within the digital calendar 804. In particular, the task scheduling system 102 utilizes a graph neural network (and in some instances an inferencer model) to generate an initial digital calendar including a sequential order of tasks for a user based on explicit input provided by the user or based on previous schedules generated for the user. While FIG. 8A illustrates the digital calendar 804 including tasks during a single day, the task scheduling system 102 can generate calendars for any time period and including tasks that correspond to any time range within the time period.

FIG. 8A also illustrates that the client device 800 displays a replanning option 806 to recreate at least part of the digital calendar 804. For instance, in response to a selection of the replanning option 806, the client device 800 provides a request to the task scheduling system 102 to modify the digital calendar 804. In one or more embodiments, the request to the task scheduling system 102 based on the selection of the replanning option 806 corresponds to a schedule modification or interruption of the digital calendar 804. In one or more alternative embodiments, the client device 800 provides an indication of a schedule modification/interruption based on additional data, such as location data, user inputs related to a task, automatically detected task completion, etc.

Figure 8B:
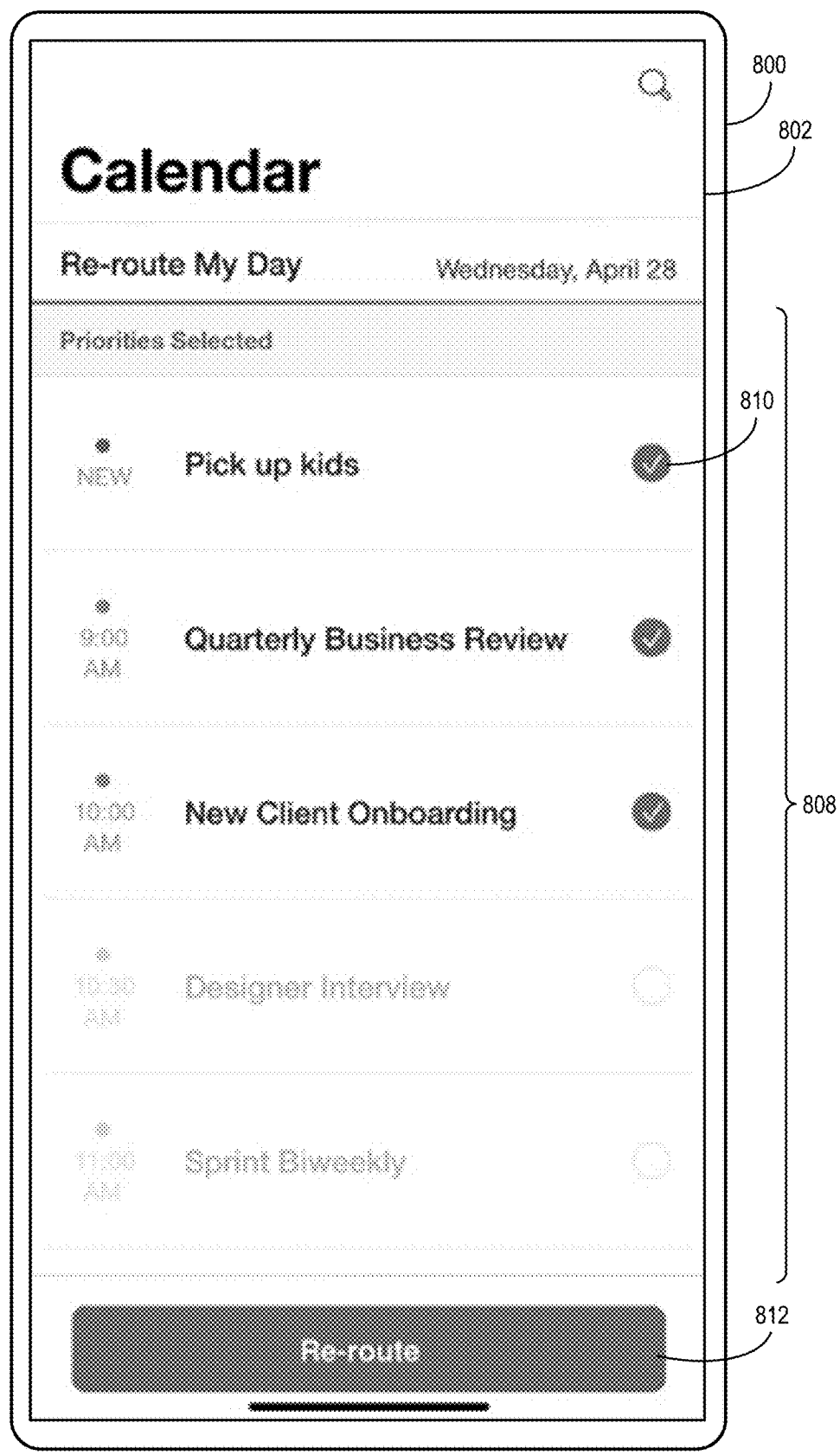

In one or more embodiments, in response to a request to modify an existing schedule during a time period associated with the schedule, the task scheduling system 102 receives additional input from a user. For example, FIG. 8B illustrates that the client device 800 displays a list of candidate tasks 808 for rescheduling one or more tasks for a remainder of the time period. More specifically, the client device 800 determines one or more sequences of tasks to modify the digital calendar 804 by utilizing a reinforcement learning model (e.g., the reinforcement learning model of FIG. 6). The task scheduling system 102 then provides one or more tasks as recommendations in the list of candidate tasks 808 based on the sequences of tasks. FIG. 8B also illustrates that the client device 800 detects selection of one or more tasks (e.g., task 810) corresponding to the previously identified sequence(s) of tasks in the list of candidate tasks 808. The client device 800 further displays a confirmation option 812 to confirm the request to modify the existing schedule.

Figure 8C:
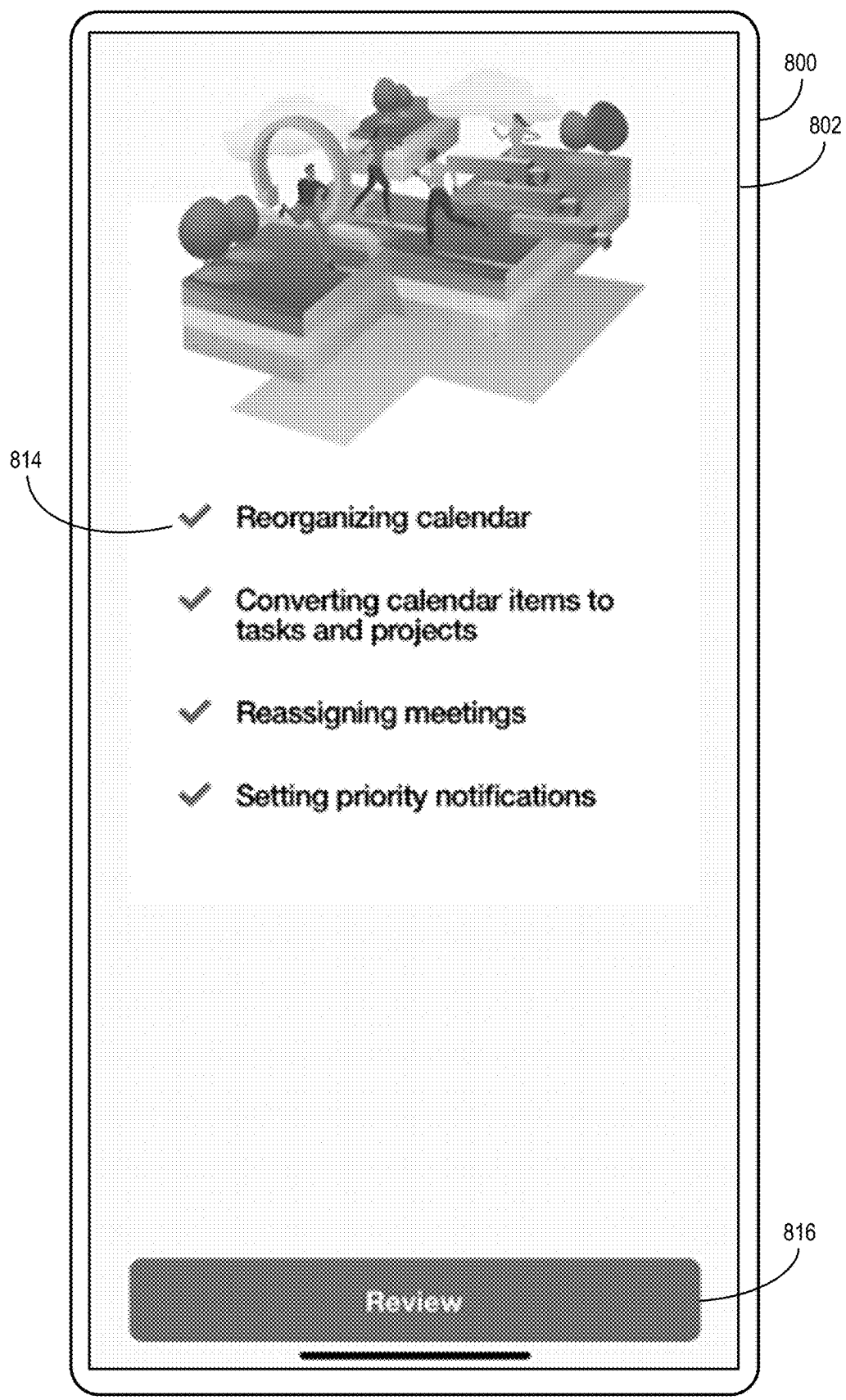

After identifying a request to modify a schedule (e.g., after receiving confirmation of the request), the task scheduling system 102 modifies the schedule for the remaining time period. For example, FIG. 8C illustrates that the client device 800 displays a set of operations (e.g., operation 814) that the task scheduling system 102 performs to modify the schedule. To illustrate, the task scheduling system 102 performs operations to reorganize tasks within a digital calendar, convert calendar items to tasks/projects, reassign meetings involving a plurality of users, and setting priority notifications associated with the tasks. FIG. 8C further illustrates that the client device 800 displays a review option 816 to review the modified schedule after performing the operations.

Specifically, the task scheduling system 102 utilizes the selected tasks illustrated in FIG. 8B to modify one or more schedules of one or more users. For instance, the task scheduling system 102 determines a sequential order of the tasks according to any constraints indicating that certain tasks be performed at specific times, in a specific order, or involving one or more additional users. The task scheduling system 102 then assigns the tasks to available times during a time period of the digital calendar 804 according to the determined sequential order. Additionally, the task scheduling system 102 generates calendar items for the tasks according to the specific digital calendar application 802 and inserts the calendar items into a modified digital calendar.

Figure 8D:
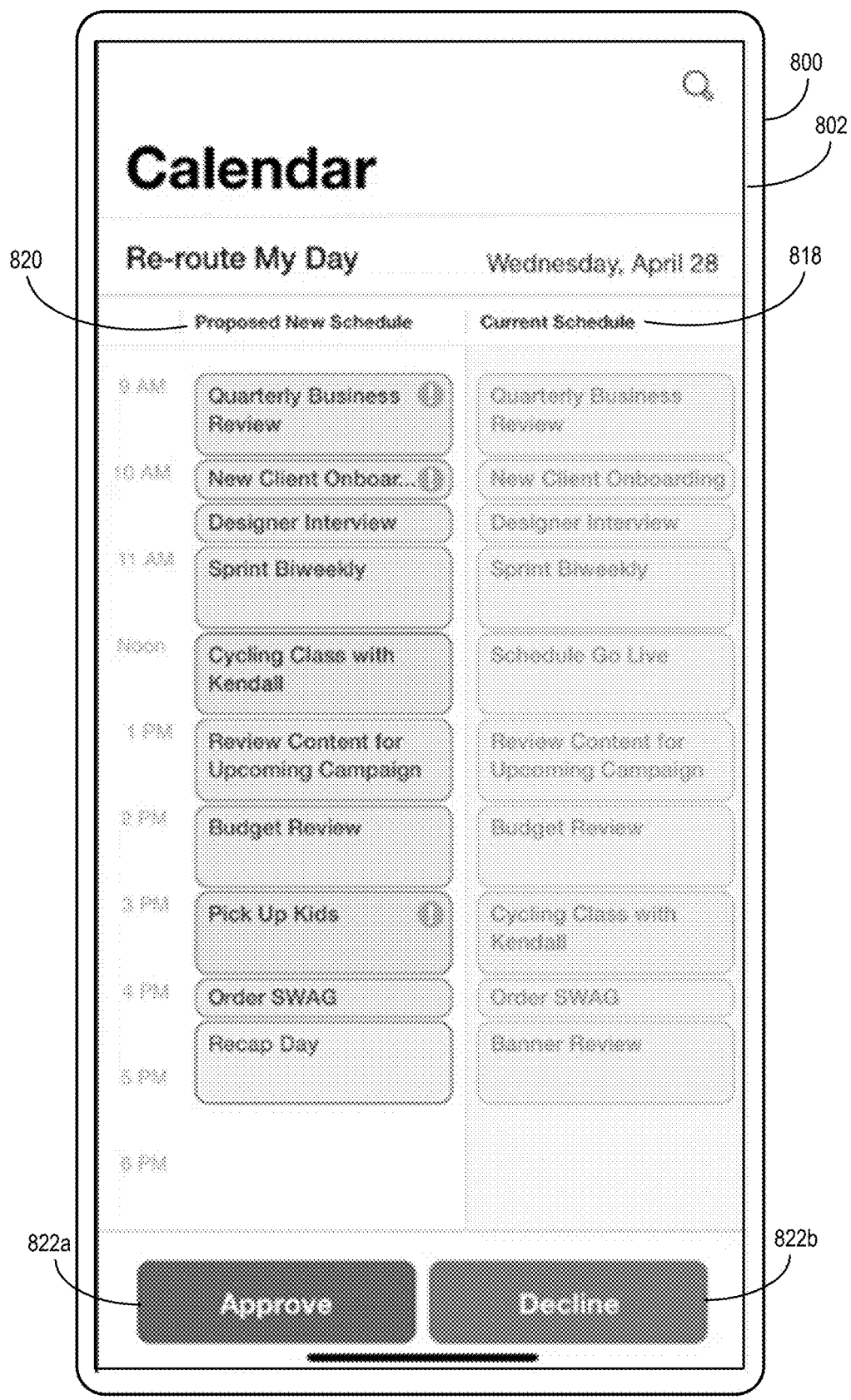

As illustrated in FIG. 8D, the client device 800 displays a side-by-side comparison of the current schedule 818 and a proposed new schedule 820 within the digital calendar application 802. For example, the client device 800 displays a plurality of tasks of the current schedule 818 during a period of time and a plurality of task of the proposed new schedule 820 during the same period of time. As illustrated, the proposed new schedule 820 includes several different tasks than the current schedule 818. FIG. 8D also displays an approve option 822a or a decline option 822b to either accept or reject the proposed new schedule 820.

Figure 8E:
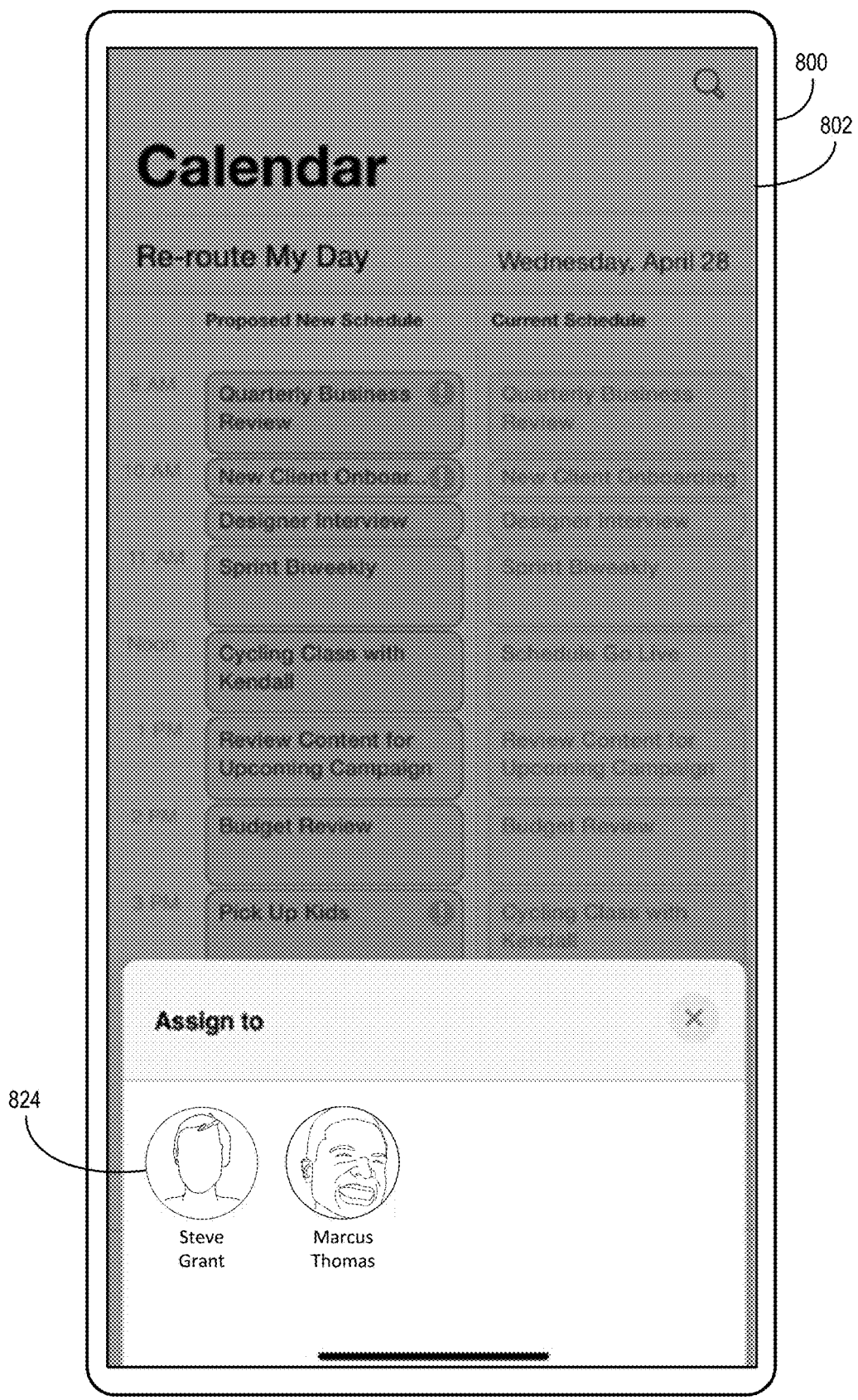

In one or more embodiments, the task scheduling system 102 also provides options for assigning a task in the modified schedule to one or more other users. For example, as illustrated in FIG. 8E, in response to a selection of one or more of the tasks in the proposed new schedule via the graphical user interface of the digital calendar application 802, the client device displays options to assign the selected task(s) to one or more other users (e.g., via user icon 824). To illustrate, the task scheduling system 102 determines one or more users that are associated with the task (e.g., based on user groups, user preferences, or historical assignments) or based on availability of one or more other users. The task scheduling system 102 then obtains user information for the identified user(s) and provides one or more icons associated with the user information for display in the graphical user interface at the client device 800.

In some embodiments, the task scheduling system 102 utilizes the reinforcement learning to assign a selected task to one or more other users. In particular, the task scheduling system 102 can include assignment of a selected task as a possible action to recommend within the Markov decision process. The task scheduling system 102 can analyze the probability of a reward in light of this action of assigning the task to another and generate a policy reflecting this probability. Accordingly, the task scheduling system 102 can utilize the reinforcement learning model to assign tasks between users in response to interruptions in a digital calendar.

Figure 8F:
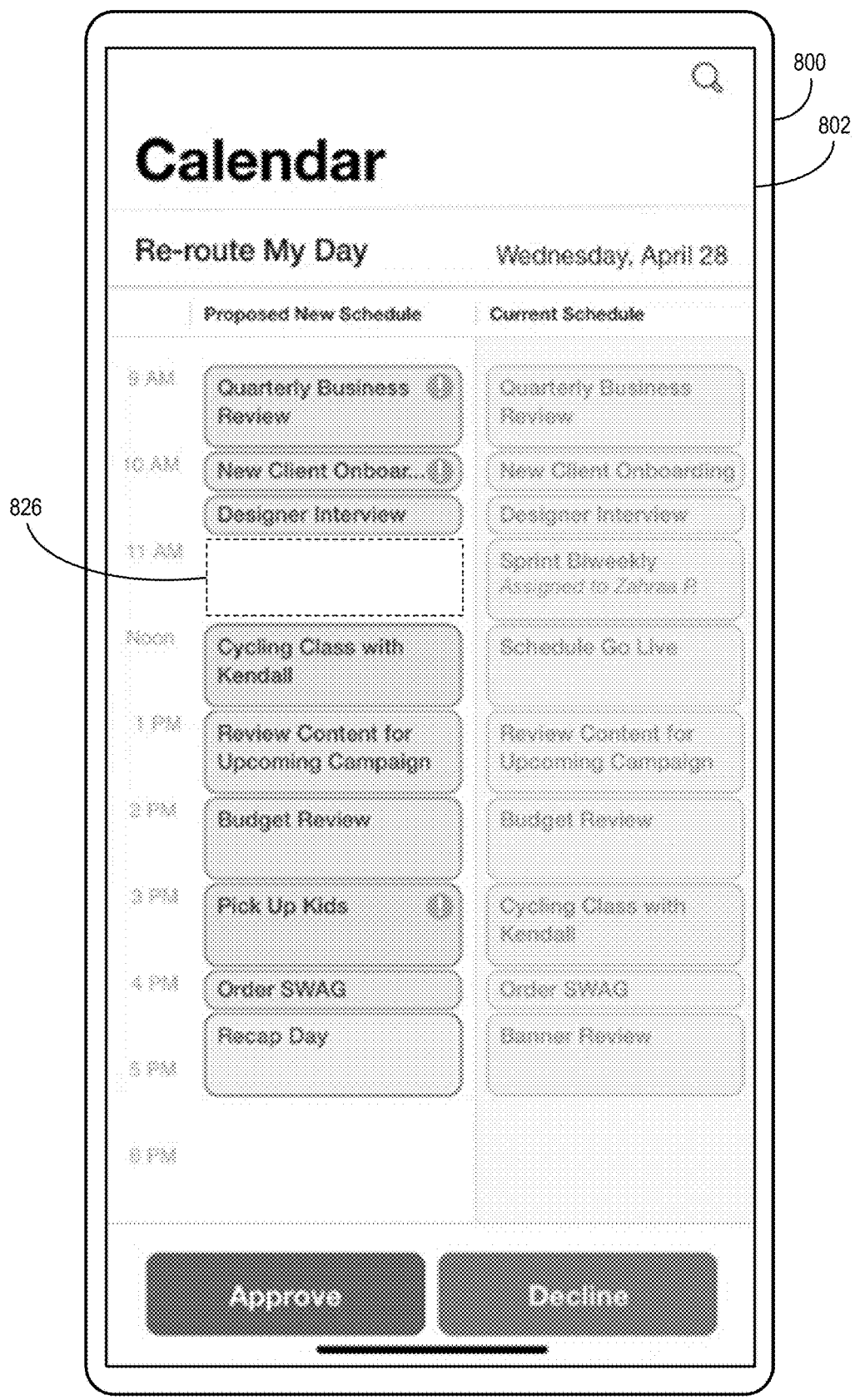
Figure 8G:
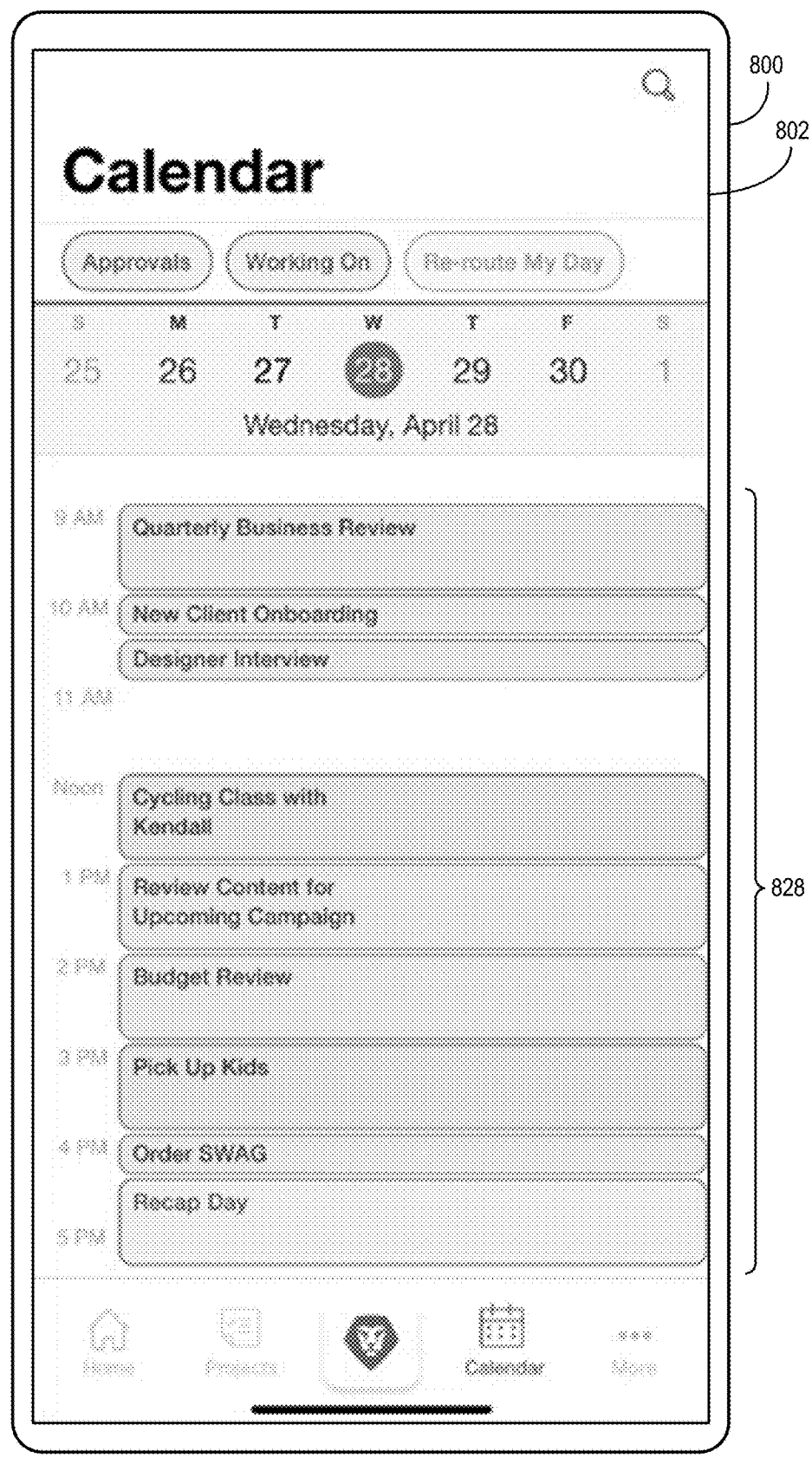

In response to a selection of a task and another user via the user icon 824, the task scheduling system 102 reassigns the selected task to the other user. Specifically, FIG. 8F illustrates that the client device 800 displays a space 826 in the proposed new schedule where the task was previously located. As FIG. 8G illustrates, after the task scheduling system 102 determines that the proposed new schedule is accepted, the client device 800 displays the modified calendar 828 within the digital calendar application 802 in place of the previous schedule.

Figure 8H:
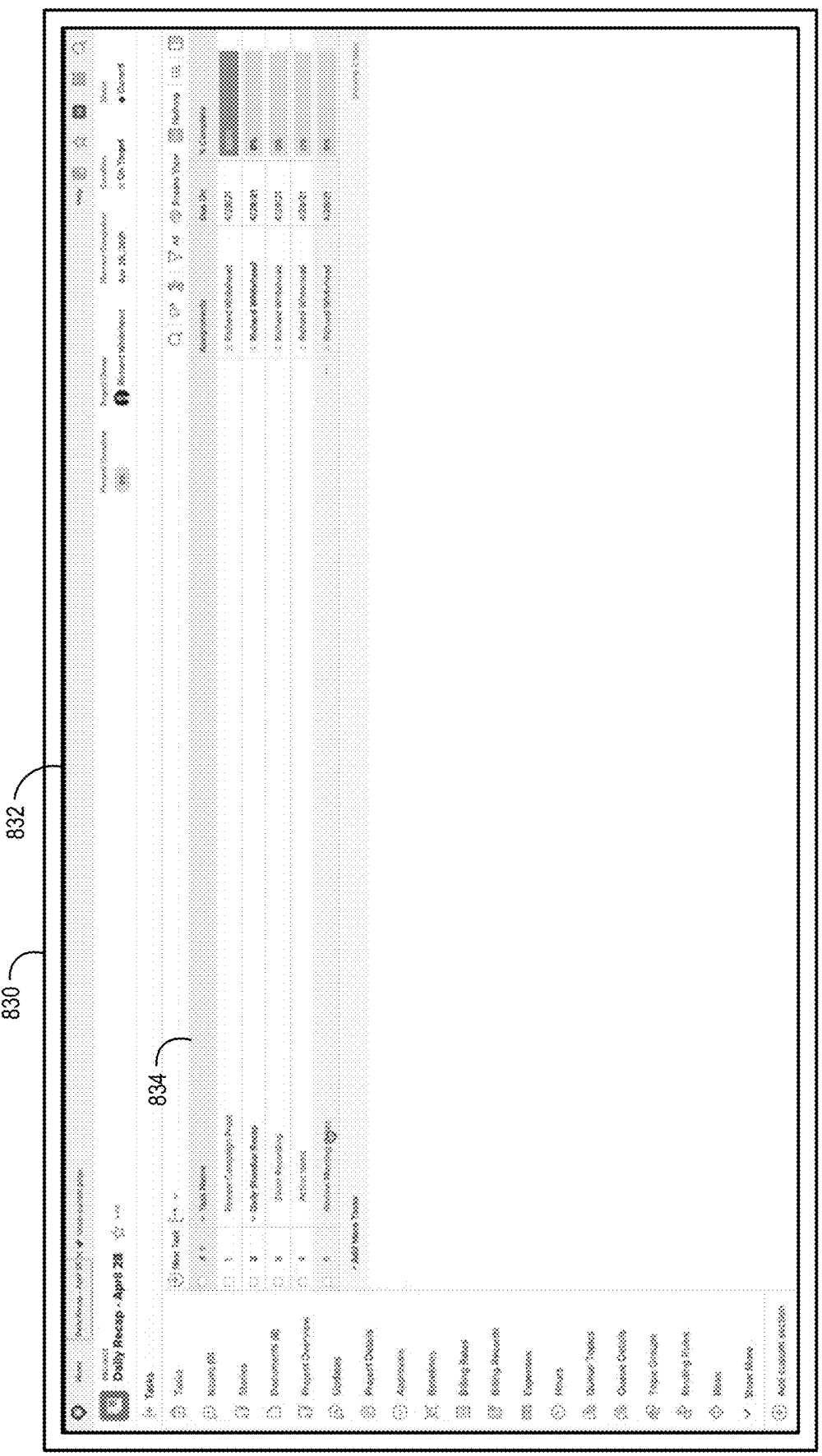

According to one or more embodiments, the task scheduling system 102 monitors the performance of each task during the time period corresponding to the modified calendar 828. Additionally, the task scheduling system 102 provides an option to review the schedule. For example, FIG. 8H illustrates that a client device 830 (e.g., a different client device) displays a graphical user interface of an additional display calendar application 832 (e.g., via a web-based application). More specifically, the client device 830 further displays a list of tasks 834 for a specific time period along with additional details about each of the tasks. Furthermore, the list of tasks 834 includes the monitored performance for each task (e.g., a completion percentage).

Figure 9:
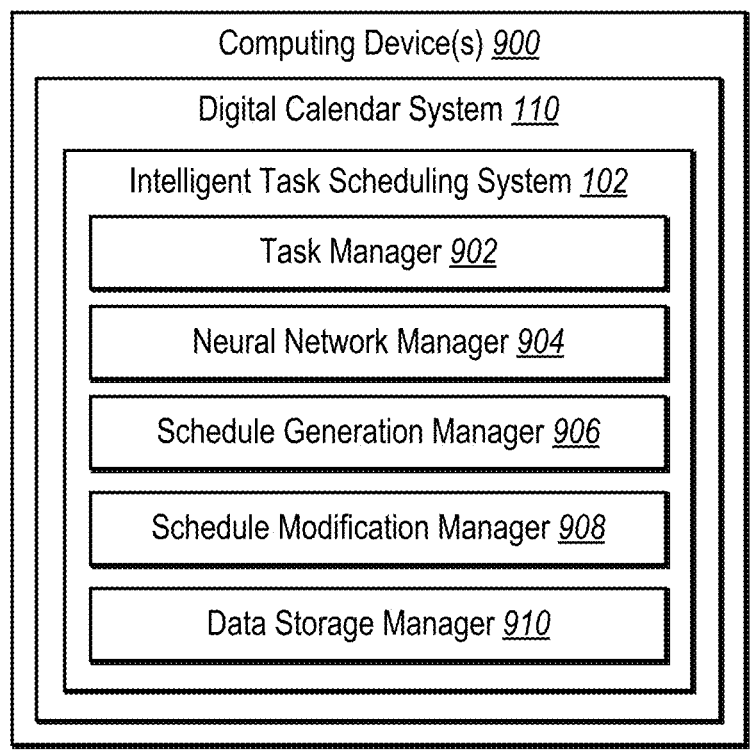
FIG. 9 illustrates a diagram of the intelligent task scheduling system of FIG. 1 in accordance with one or more implementations.

FIG. 9 illustrates a detailed schematic diagram of an embodiment of the intelligent task scheduling system 102 described above. As shown, the task scheduling system 102 is implemented in a digital calendar system 110 on computing device(s) 900 (e.g., a client device and/or server device as described in FIG. 1, and as further described below in relation to FIG. 11). Additionally, in one or more embodiments, the task scheduling system 102 includes, but is not limited to, a task manager 902, a neural network manager 904, a schedule generation manager 906, a schedule modification manager 908 and a data storage manager 910. The task scheduling system 102 can be implemented on any number of computing devices. In one or more embodiments, the task scheduling system 102 is implemented in a distributed system of server devices for digital calendar generation and modification. In alternative embodiments, the task scheduling system 102 is implemented within one or more additional systems. Alternatively, the task scheduling system 102 may be implemented on a single computing device such as a single client device.

In one or more embodiments, each of the components of the task scheduling system 102 is in communication with other components using any suitable communication technologies. Additionally, in some embodiments, the components of the task scheduling system 102 are in communication with one or more other devices including other computing devices of a user, server devices (e.g., cloud storage devices), licensing servers, or other devices/systems. It will be recognized that although the components of the task scheduling system 102 are shown to be separate in FIG. 9, any of the subcomponents may be combined into fewer components, such as into a single component, or divided into more components as may serve a particular implementation. Furthermore, although the components of FIG. 9 are described in connection with the task scheduling system 102, in one or more embodiments, at least some of the components for performing operations in conjunction with the task scheduling system 102 described herein are implemented on other devices within the environment.

In some embodiments, the components of the task scheduling system 102 include software, hardware, or both. For example, the components of the task scheduling system 102 include one or more instructions stored on a computer-readable storage medium and executable by processors of one or more computing devices (e.g., the computing device(s) 900). When executed by the one or more processors, the computer-executable instructions of the task scheduling system 102 can cause the computing device(s) 900 to perform the operations described herein. Alternatively, the components of the task scheduling system 102 can include hardware, such as a special purpose processing device to perform a certain function or group of functions. Additionally, or alternatively, the components of the task scheduling system 102 can include a combination of computer-executable instructions and hardware.

Furthermore, the components of the task scheduling system 102 performing the functions described herein with respect to the task scheduling system 102 may, for example, be implemented as part of a stand-alone application, as a module of an application, as a plug-in for applications, as a library function or functions that may be called by other applications, and/or as a cloud-computing model. Thus, the components of the task scheduling system 102 may be implemented as part of a stand-alone application on a personal computing device or a mobile device. Alternatively, or additionally, the components of the task scheduling system 102 may be implemented in any application that provides digital calendar generation.

As described herein, the task scheduling system 102 includes a task manager 902 to manage tasks for a plurality of users. For example, the task manager 902 determines historical tasks associated with the plurality of users and candidate tasks associated with the plurality of users. In one or more embodiments, the task manager 902 also manages context information associated with tasks to indicate context such as day, time of day, season, month, weather, or any other contextual information that can distinguish two similar tasks.

Additionally, the task scheduling system 102 includes a neural network manager 904 that manages a graph neural network. For instance, the neural network manager 904 manages a graph neural network including a bipartite graph with a set of user nodes and a set of task nodes. In one or more embodiments, the neural network manager 904 utilizes a graph neural network to determine edge weights between user nodes and task nodes. Furthermore, the neural network manager 904 utilizes the graph neural network to generate performance efficiency scores. In one or more embodiments, the neural network manager 904 also manages an inferencer model to generate task contribution scores in connection with the performance efficiency scores.

In one or more embodiments, the task scheduling system 102 includes a schedule generation manager 906 to generate schedules for users. For instance, the schedule generation manager 906 utilizes the graph neural network and edge weights to rank task sets for a user. Additionally, the schedule generation manager 906 utilizes the ranked task sets to generate one or more schedules including ordered sequences of tasks for the user. Additionally, the schedule generation manager 906 can utilize user input to generate task sets and/or schedules for the user.

According to one or more embodiments, the task scheduling system 102 includes a schedule modification manager 908 to modify existing schedules. To illustrate, the schedule modification manager 908 manages a reinforcement learning model that utilizes historical and current task data, contextual data, constraints, and user input to determine one or more new task sets for modifying a schedule. Specifically, the schedule modification manager 908 detects indications of schedule modifications or interruptions for an existing schedule. The schedule modification manager 908 then generates a modified schedule including one or more additional tasks to replace one or more tasks from an initial schedule.

The task scheduling system 102 also includes a data storage manager 910 (that comprises a non-transitory computer memory/one or more memory devices) that stores and maintains data associated with processing digital text in digital content items. For example, the data storage manager 910 stores data associated with generating and modifying digital managers. To illustrate, the data storage manager 910 stores information associated with a graph neural network (e.g., a bipartite graph with edge weights), user accounts, tasks, annotation data, task sets, and schedules.

Figure 10:
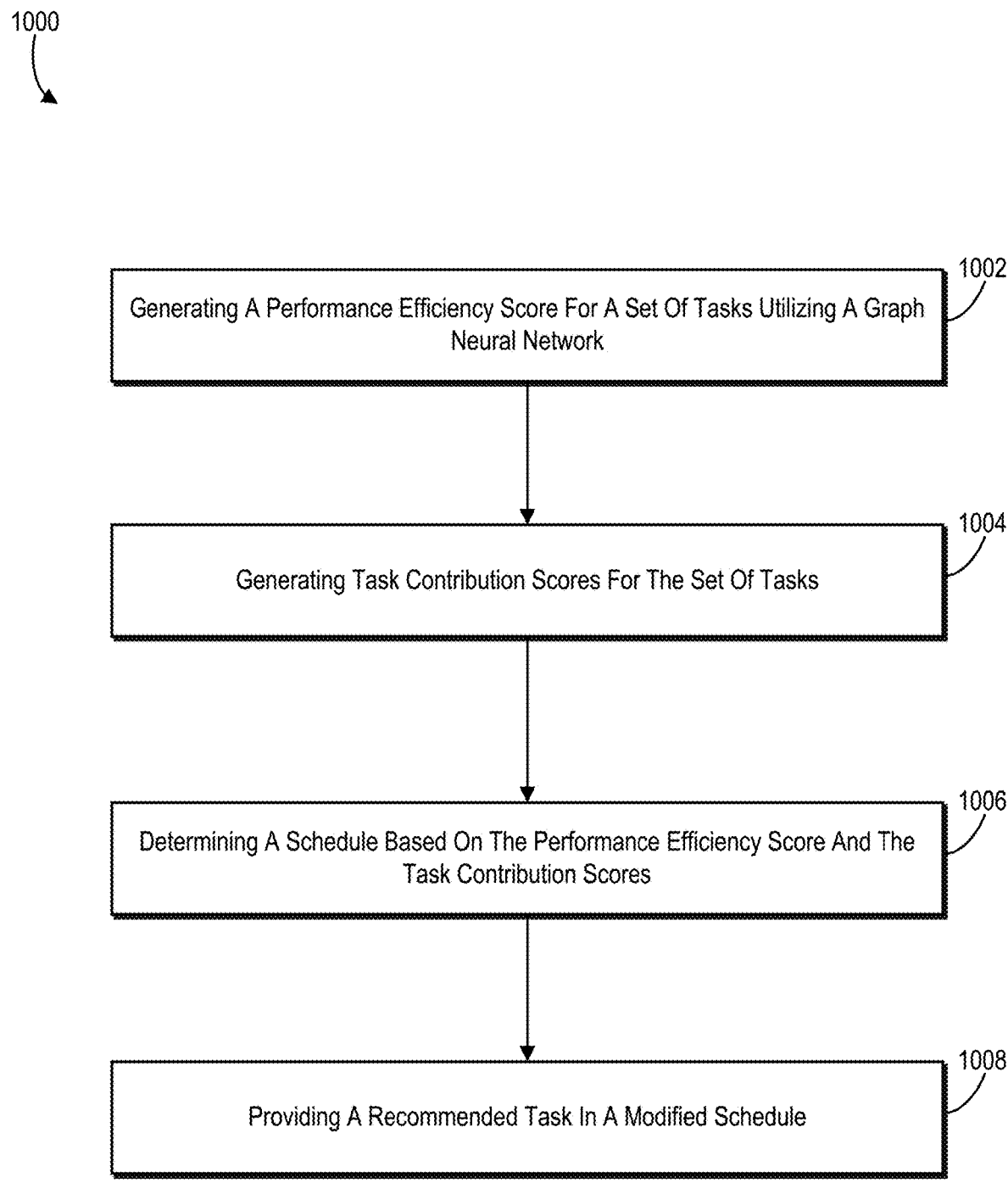
FIG. 10 illustrates a flowchart of a series of acts for intelligently determining and modifying a schedule in accordance with one or more implementations.

Turning now to FIG. 10, this figure shows a flowchart of a series of acts 1000 of utilizing a graph neural network and reinforcement learning to intelligently generate and modify scheduled tasks. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10.

As shown, the series of acts 1000 includes an act 1002 of generating a performance efficiency score for a set of tasks utilizing a graph neural network. For example, act 1002 involves generating, utilizing a graph neural network, a performance efficiency score for a set of tasks from a plurality of candidate tasks corresponding to a user. Act 1002 can also involve generating, utilizing the graph neural network, an estimated number of completed tasks and an estimated number of uncompleted tasks from the set of tasks. Act 1002 can further involve generating the performance efficiency score based on the estimated number of completed tasks and the estimated number of uncompleted tasks. For example, act 1002 involves determining a difference between an estimated number of completed tasks and an estimated number of uncompleted tasks in the set of tasks.

In one or more embodiments, act 1002 involves determining edge weights between user nodes and annotated task nodes in a bipartite graph of the graph neural network. In one or more embodiments, the annotated task nodes are annotated with context information associated with a plurality of candidate tasks. For example, act 1002 can involve determining edge weights between a user node corresponding to the user and a subset of the set of task nodes according to the first set of tasks. Additionally, act 1002 can involve generating the performance efficiency score for the set of tasks based on the edge weights. For instance, act 1002 can involve generating the first performance efficiency score based on the edge weights between the user node and the subset of the set of task nodes.

For example, act 1002 can involve generating, utilizing edge weights between the set of user nodes and the set of task nodes of the graph neural network, a first performance efficiency score for a first set of tasks from a plurality of candidate tasks corresponding to a user. Furthermore, act 1002 can involve generating, utilizing the edge weights between the set of user nodes and the set of task nodes of the graph neural network, a second performance efficiency score for a second set of tasks from the plurality of candidate tasks corresponding to the user. Additionally, act 1002 can involve generating, based on the edge weights between the set of user nodes and the set of task nodes, a plurality of task contribution scores for the first set of tasks indicating a contribution of each task of the set of tasks to the first performance efficiency score. Act 1002 can further involve providing, for display at a client device of the user, a recommendation to modify the first set of tasks based on the plurality of task contribution scores.

In one or more embodiments, act 1002 can involve determining the edge weights between the set of user nodes and the set of task nodes in the bipartite graph of the graph neural network utilizing historical schedule completion data associated with the user. Act 1002 can also involve determining new schedule completion data for the schedule indicating a number of completed tasks and a number of uncompleted tasks in the first set of tasks after the time period. Act 1002 can further involve determining updated edge weights between the set of user nodes and the set of task nodes based on the new schedule completion data.

The series of acts 1000 includes an act 1004 of generating task contribution scores for the set of tasks. For example, act 1004 involves generating, from edge weights between nodes of the graph neural network, a plurality of task contribution scores for the set of tasks in connection with the performance efficiency score. For example, act 1004 involves generating, for the user, a plurality of task contribution scores for the set of tasks in connection with the performance efficiency score by determining norm values of weights associated with the annotated task nodes of the graph neural network. In one or more embodiments, act 1004 involves determining the norm values utilizing backpropagation of the graph neural network.

Additionally, the series of acts 1000 includes an act 1006 of determining a schedule based on the performance efficiency score and the task contribution scores. For example, act 1006 involves determining, based on the performance efficiency score and the plurality of task contribution scores, a schedule comprising an ordered sequence of the set of tasks for a time period.

Act 1006 can involve determining a ranked list of a plurality of sets of tasks based on a plurality of performance efficiency scores for the plurality of sets of tasks. Additionally, act 1006 can involve determining the schedule by selecting the set of tasks from the ranked list of the plurality of sets of tasks.

Act 1006 can further involve generating a plurality of schedules comprising a plurality of different ordered sequences of the set of tasks according to one or more constraints corresponding to the user. Act 1006 can also involve determining the schedule from the plurality of schedules in response to a user input selecting the schedule. For example, act 1006 can involve determining, based on the ranked list, a predetermined number of schedules comprising a plurality of ordered sequences of tasks based on the plurality of sets of tasks, and selecting the schedule from the predetermined number of schedules.

Act 1006 can involve determining a schedule comprising an ordered sequence of the first set of tasks for a time period by comparing the first performance efficiency score to the second performance efficiency score.

The series of acts 1000 also includes an act 1008 of providing a recommended task in a modified schedule. For example, act 1008 involves, in response to detecting a modification to the schedule during the time period, provide, for display via a client device of the user, a recommended task in a modified schedule utilizing a reinforcement learning model. Additionally, act 1008 can also involve providing a recommendation to add a new task to the set of tasks or remove a task from the set of tasks based on the plurality of task contribution scores.

Act 1008 can involve detecting a modification to the schedule comprising a performance of a new task or a missed performance of a task of the first set of tasks during the time period. Act 1008 can also involve determining a modified ordered sequence of tasks utilizing a reinforcement learning model. Act 1008 can further involve providing, for display via a client device of the user, a recommended task from the modified ordered sequence of tasks. For example, act 1008 can involve determining, utilizing a reinforcement learning model, a new ordered sequence of tasks in response to the detected modification to the ordered sequence.

Act 1008 can also involve detecting performance of an additional task not in the ordered sequence of the set of tasks during the time period. Act 1008 can further involve determining, utilizing the reinforcement learning model, the recommended task in a modified ordered sequence of tasks in response to detecting the performance of the additional task. Additionally, the series of acts 1000 can include determining a plurality of candidate modified ordered sequences of tasks in response to detecting the performance of the additional task. The series of acts 1000 can further include selecting the modified ordered sequence of tasks utilizing a Markov decision process in the reinforcement learning model according to one or more constraints associated with the user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
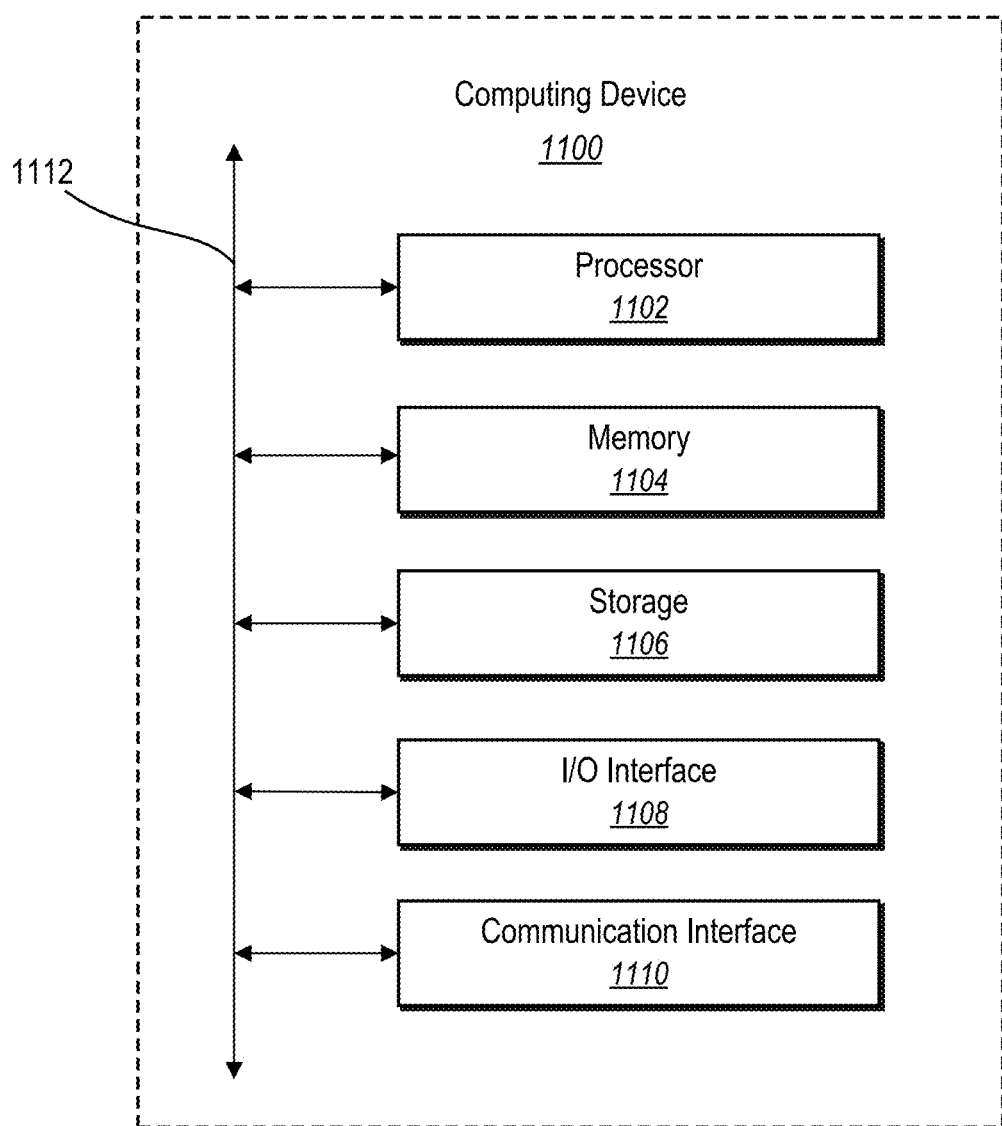
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the system(s) of FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   generate, utilizing a graph neural network, a performance efficiency score for a set of tasks from a plurality of candidate tasks corresponding to a user, wherein the performance efficiency score indicates a difference between an estimated number of completed tasks of the set of tasks and an estimated number of uncompleted tasks of the set of tasks;
   generate, from edge weights between a set of task nodes and a set of user nodes of the graph neural network, a plurality of task contribution scores for the set of tasks in connection with the performance efficiency score by:
      determining, for a task of the set of tasks utilizing an inferencer model with the graph neural network, a norm of edge weights for a task node corresponding to the task in the graph neural network by a back-propagation step for a final layer in the graph neural network via normalizing a combination of edge weights for the task node corresponding to the task in the graph neural network,
   wherein the plurality of task contribution scores indicate a contribution of the task of the set of tasks to the performance efficiency score according to a feature of the task and a dependency between the task and the user;

determine, based on the performance efficiency score and the plurality of task contribution scores, a schedule comprising an ordered sequence of the set of tasks for a time period;

generate, according to a prior user input within a graphical user interface indicating selection of a prior modified schedule, trajectory data associated with the user; and in response to detecting a user input within the graphical user interface requesting modification to the schedule during the time period and according to the trajectory data, generate, for display via a client device of the user and utilizing the edge weights between the set of task nodes and the set of user nodes, a recommended task in a modified schedule utilizing a reinforcement learning model.

2. The non-transitory computer readable storage medium as recited in claim 1, further comprising instructions that, when executed by the at least one processor, cause the computing device to generate the recommended task in a modified schedule by:

generating an updated graph neural network by providing the trajectory data to the graph neural network to the edge weights between the set of task nodes and the set of user nodes; and generating, according to the updated graph neural network, the recommended task in the modified schedule utilizing the reinforcement learning model.

3. The non-transitory computer readable storage medium as recited in claim 1, further comprising instructions that, when executed by the at least one processor, cause the computing device to generate the performance efficiency score for the set of tasks by:

determining the edge weights between the set of user nodes and the set of task nodes comprising annotations in a bipartite graph of the graph neural network; and generating the performance efficiency score for the set of tasks based on the edge weights.

4. The non-transitory computer readable storage medium as recited in claim 3, further comprising instructions that, when executed by the at least one processor, cause the computing device to:

generate, for the user, the plurality of task contribution scores for the set of tasks in connection with the performance efficiency score by determining norm values of weights associated with the set of task nodes of the graph neural network; and determine the schedule comprising the ordered sequence of the set of tasks further based on the plurality of task contribution scores.

5. The non-transitory computer readable storage medium as recited in claim 4, further comprising instructions that, when executed by the at least one processor, cause the computing device to provide a recommendation to add a new task to the set of tasks or remove a task from the set of tasks based on the plurality of task contribution scores.

6. The non-transitory computer readable storage medium as recited in claim 1, further comprising instructions that, when executed by the at least one processor, cause the computing device to determine the schedule by:

determining a ranked list of a plurality of sets of tasks based on a plurality of performance efficiency scores for the plurality of sets of tasks; and determining the schedule by selecting the set of tasks from the ranked list of the plurality of sets of tasks.

7. The non-transitory computer readable storage medium as recited in claim 1, further comprising instructions that, when executed by the at least one processor, cause the computing device to determine the schedule by:

generating a plurality of schedules comprising a plurality of different ordered sequences of the set of tasks according to one or more constraints corresponding to the user; and determining the schedule from the plurality of schedules in response to a user input selecting the schedule.

8. The non-transitory computer readable storage medium as recited in claim 1, further comprising instructions that, when executed by the at least one processor, cause the computing device to provide the recommended task by:

detecting performance of an additional task not in the ordered sequence of the set of tasks during the time period; and determining, utilizing the reinforcement learning model, the recommended task in a modified ordered sequence of tasks in response to detecting the performance of the additional task.

9. The non-transitory computer readable storage medium as recited in claim 8, further comprising instructions that, when executed by the at least one processor, cause the computing device to:

determine a plurality of candidate modified ordered sequences of tasks in response to detecting the performance of the additional task; and select the modified ordered sequence of tasks utilizing a Markov decision process in the reinforcement learning model according to one or more constraints associated with the user.

10. A system comprising:

one or more memory devices comprising a graph neural network having a bipartite graph including a set of user nodes and a set of task nodes, the set of user nodes distinct from the set of task nodes; and one or more computing devices configured to cause the system to:

generate, utilizing edge weights between the set of user nodes and the set of task nodes of the graph neural network, a first performance efficiency score for a first set of tasks from a plurality of candidate tasks corresponding to a user, wherein the first performance efficiency score indicates a difference between an estimated number of completed tasks of the first set of tasks and an estimated number of uncompleted tasks of the first set of tasks;

generate, from the edge weights between the set of task nodes and the set of user nodes of the graph neural network, a first plurality of task contribution scores for the first set of tasks in connection with the first performance efficiency score by:

determining, for a task of the first set of tasks utilizing an inferencer model with the graph neural network, a norm of edge weights for a task node corresponding to the task in the graph neural network by a backpropagation step for a final layer in the graph neural network via normalizing a combination of edge weights for the task node corresponding to the task in the graph neural network, wherein the first plurality of task contribution scores indicate a contribution of the task of the first set of tasks to the first performance efficiency score according to a feature of the task and a dependency between the task and the user;

generate, utilizing the edge weights between the set of user nodes and the set of task nodes of the graph neural network, a second performance efficiency score for a second set of tasks from the plurality of candidate tasks corresponding to the user in response to user input within a graphical user interface requesting replanning during a time period;

generate, according to a prior user input within the graphical user interface indicating selection of a prior modified schedule, trajectory data associated with the user; and determine, according to the trajectory data, a schedule comprising an ordered sequence of the first set of tasks for the time period by comparing the first performance efficiency score in combination with the first plurality of task contribution scores to the second performance efficiency score.

11. The system as recited in claim 10, wherein the one or more computing devices are further configured to cause the system to generate the first performance efficiency score by:

determining edge weights between a user node corresponding to the user and a subset of the set of task nodes according to the first set of tasks; and generating the first performance efficiency score based on the edge weights between the user node and the subset of the set of task nodes.

12. The system as recited in claim 11, wherein the one or more computing devices are further configured to cause the system to generate the first performance efficiency score by:

generating, from the subset of the set of task nodes, the estimated number of completed tasks and the estimated number of uncompleted tasks from the subset of the set of task nodes; and generating the first performance efficiency score by determining the difference between the estimated number of completed tasks and the estimated number of uncompleted tasks and based on numeric task priorities associated with the subset of the set of task nodes.

13. The system as recited in claim 10, wherein the one or more computing devices are further configured to cause the system to:

determine the edge weights between the set of user nodes and the set of task nodes in the bipartite graph of the graph neural network utilizing historical schedule completion data associated with the user;

determine new schedule completion data for the schedule indicating a number of completed tasks and a number of uncompleted tasks in the first set of tasks after the time period; and determine updated edge weights between the set of user nodes and the set of task nodes based on the new schedule completion data.

14. The system as recited in claim 10, wherein the one or more computing devices are further configured to cause the system to:

generate, based on the edge weights between the set of user nodes and the set of task nodes, a second plurality of task contribution scores for the second set of tasks indicating a contribution of each task of the second set of tasks to the second performance efficiency score; and provide, for display at a client device of the user, a recommendation to modify the second set of tasks based on the second plurality of task contribution scores.

15. The system as recited in claim 10, wherein the one or more computing devices are further configured to cause the system to:

detect a modification to the schedule comprising a performance of a new task or a missed performance of a task of the first set of tasks during the time period;

determine a modified ordered sequence of tasks utilizing a reinforcement learning model; and provide, for display via a client device of the user, a recommended task from the modified ordered sequence of tasks.

16. A computer-implemented method comprising:

generating, utilizing a graph neural network, a performance efficiency score for a set of tasks from a plurality of candidate tasks corresponding to a user, wherein the performance efficiency score indicates a difference between an estimated number of completed tasks for the set of tasks and an estimated number of uncompleted tasks of the set of tasks;

generating, from edge weights between a set of task nodes and a set of user nodes of the graph neural network, a plurality of task contribution scores for the set of tasks in connection with the performance efficiency score by:

determining, for a task of the set of tasks utilizing an inferencer model with the graph neural network, a norm of edge weights for a task node corresponding to the task in the graph neural network by a backpropagation step for a final layer in the graph neural network via normalizing a combination of edge weights for the task node corresponding to the task in the graph neural network, wherein the plurality of task contribution scores indicate a contribution of the task of the set of tasks to the performance efficiency score according to a feature of the task and a dependency between the task and the user; and determining, based on the performance efficiency score and the plurality of task contribution scores, a schedule comprising an ordered sequence of the set of tasks for a time period in response to a user input within a graphical user interface requesting replanning during the time period.

17. The computer-implemented method as recited in claim 16, wherein generating the performance efficiency score comprises:

determining the edge weights between the set of user nodes and the set of task nodes annotated with context information associated with the plurality of candidate tasks; and generating, utilizing the edge weights of the graph neural network, the performance efficiency score by determining the difference between the estimated number of completed tasks and the estimated number of uncompleted tasks in the set of tasks.

18. The computer-implemented method as recited in claim 17, wherein generating the plurality of task contribution scores for the set of tasks comprises:

determining, utilizing backpropagation of the graph neural network, a plurality of edge weights associated with a task node of the set of task nodes;

determining a norm value of the plurality of edge weights for the task node; and generating a task contribution score for a task associated with the task node based on the norm value.

19. The computer-implemented method as recited in claim 16, wherein determining the schedule comprises:

determining a ranked list of a plurality of sets of tasks based on a plurality of performance efficiency scores for the plurality of sets of tasks;

determining, based on the ranked list, a predetermined number of schedules comprising a plurality of ordered sequences of tasks based on the plurality of sets of tasks; and selecting the schedule from the predetermined number of schedules.

20. The computer-implemented method as recited in claim 16, further comprising:

detecting a modification to the ordered sequence of the set of tasks during the time period;

determining, utilizing a reinforcement learning model, a new ordered sequence of tasks in response to the detected modification to the ordered sequence by determining latent features associated with the user including a propensity of the user to accept a recommended task; and providing, for display at a client device of the user, one or more recommended tasks from the new ordered sequence of tasks during the time period.

* * * * *